United States Patent
Sirkar et al.

[19]

[11] Patent Number: 6,165,253
[45] Date of Patent: Dec. 26, 2000

[54] APPARATUS FOR REMOVAL OF VOLATILE ORGANIC COMPOUNDS FROM GASEOUS MIXTURES

[75] Inventors: Kamelesh K. Sirkar, Berkeley Heights; Sudipto Majumdar, Ridgefield; Tarun Poddar, Jersey City, all of N.J.

[73] Assignee: New Jersey Institute of Technology, Newark, N.J.

[21] Appl. No.: 08/248,062

[22] Filed: May 23, 1994

[51] Int. Cl.[7] .......................... B01D 53/22; B01D 53/14
[52] U.S. Cl. ............................. 96/6; 86/8; 86/10; 95/49; 95/50; 95/51; 95/54
[58] Field of Search ................... 95/44–46, 50, 95/49, 51, 54; 96/4–14

[56] References Cited

U.S. PATENT DOCUMENTS

| | | | |
|---|---|---|---|
| 3,911,080 | 10/1975 | Mehl et al. | 95/45 X |
| 4,750,918 | 6/1988 | Sirkar | 95/44 |
| 4,789,468 | 12/1988 | Sirkar | 210/137 |
| 4,889,541 | 12/1989 | Beaupre | 95/46 |
| 4,921,612 | 5/1990 | Sirkar | 210/644 |
| 4,942,135 | 7/1990 | Zaromb | 95/45 X |
| 4,973,434 | 11/1990 | Sirkar et al. | 96/5 X |
| 5,013,436 | 5/1991 | Lee et al. | 96/10 X |
| 5,053,132 | 10/1991 | Sirkar | 210/500.23 |
| 5,100,555 | 3/1992 | Matson | 95/46 X |
| 5,110,326 | 5/1992 | Sirkar et al. | 96/5 |
| 5,135,547 | 8/1992 | Tsou et al. | 96/5 X |
| 5,198,000 | 3/1993 | Grasso et al. | 210/644 X |
| 5,236,474 | 8/1993 | Schofield et al. | 96/10 X |
| 5,254,143 | 10/1993 | Anazawa et al. | 95/46 |
| 5,281,254 | 1/1994 | Birbara et al. | 95/44 |
| 5,354,469 | 10/1994 | Babcock | 96/12 X |

FOREIGN PATENT DOCUMENTS 0 430 334 A1  6/1991  European Pat. Off. .

OTHER PUBLICATIONS

Jansen et l., "Vapour Recovery from air with Selective Membrane Absorption", Paper presented at ICOM '93, Heidelberg, Germany, Sept. 2, (1993).
Karoor and Sirkar, "Gas Absorption Studies in Microporous Hollow Fiber Membrane Modules", Ind. Eng. Chem. Res. 32: 674–84, (1993).
Armand et al., "Absorption Method to Clean Solvent–Contaminated Process Air", Ind. Eng. Chem. Res. 29: 436–39, (1990).
Baker et al., "On Membrane Vapor Separation versus Carbon Adsorption", Paper 176d presented at the AIChE Annual Meeting, San Francisco, CA, (1989).
Semmens et al., "Using a Microporous Hollow–Fiber Membrane to Separate VOCs from Water", Journal AWWA, Apr., 162–67 (1989).
Peinemann et al., "The Separation of Organic Vapors from Air", AIChE Symp. Ser., 82 (250): 19–26, (1986).
Qi, "Microporous Hollow Fibers for Gas Absorption", J. Membrane Sci. 23: 321–32, (1985).

*Primary Examiner*—Robert H. Spitzer
*Attorney, Agent, or Firm*—Klauber & Jackson

[57] ABSTRACT

A vaporizable solute transfer system for transferring a vaporizable solute from a gas feed mixture to an absorbent liquid comprises an absorption module, a porous membrane which divides the absorption module into a gas-feed chamber and an absorbent chamber, a regeneration module, and a nonporous material which divides the regeneration module into an absorbent chamber and a vacuum atmosphere chamber. The absorption module has gas feed mixture inlet and outlet ports which communicate with the gas feed chamber, and absorbent liquid inlet and outlet ports which communicate with the absorbent chamber. The regeneration module has a liquid absorbent inlet and outlet port which communicate with the liquid absorbent chamber, and a vacuum outlet port which communicates with the vacuum chamber.

22 Claims, 18 Drawing Sheets

▽ Toluene
□ Methylene chloride
○ Acetone

APPARATUS FOR REMOVAL OF VOLATILE ORGANIC COMPOUNDS FROM GASEOUS MIXTURES

FIELD OF INVENTION

The present invention relates to an apparatus for removing volatile organic compounds from gaseous mixtures, and collecting the organic compounds in condensed form.

BACKGROUND OF THE INVENTION $N_2$ streams in chemical plants and air streams in chemical processes are contaminated by volatile organic compounds and enormous amounts of these compounds are discharged into the atmosphere. Small and mid-size distributed sources of such VOC-contaminated air are found in air stripping product streams, centrifugal purge/inerting systems, degreasing of metal parts, dry cleaning stores, printing and painting facilities, propellant manufacturing operations, soil decontamination facilities, ventilation systems, etc. The solvent encountered in such air streams are, for example, toluene, xylene, acetone, trichloroethylene, trichloroethane, methanol, ethanol, etc. These solvent vapors pose a serious environmental problem, which in turn creates a large financial expense to those companies that produce streams of volatile organic compounds. Under the Clean Air Act and government regulations, volatile organic compounds can no longer be simply discharged into the air. It is now mandatory to treat such air streams to remove volatile organic compounds.

Common methods of reducing emissions are adsorption on activated carbon, absorption in a liquid, incineration or thermal oxidation (usually without energy recovery) and catalytic oxidation. There are disadvantages to these common methods.

Firstly, adsorption on activated carbon is the most widely used process. However, this process is quite expensive, especially if the organic content in the process air stream exceeds 0.1–0.5% (Baker, R.; C. M. Bell; and H. Wijmans: "On Membrane Vapor Separation versus Carbon Absorption," Paper 174d presented at the AIChE Annual Meeting, San Francisco, Calif. (1989)). In addition, relative humidity should be lower than 30–50% for carbon adsorption to be effective. The exothermic adsorption process leads to high temperatures in the carbon beds for higher organic concentrations, resulting in persistent operational problems and even fires in the activated charcoal plant (Armand, B. L.; H. B. Uddholm; and P. T. Vikstrom: "Absorption Method to Clean Solvent-Contaminated Process Air", Ind. Eng. Chem. Res., 29, 436 (1990)). This type of method is not effective in removing light hydrocarbons. Additionally, expensive construction materials must be used to lessen contamination of activated carbon and the corrosion of equipment, which occurs during steaming to recover the solvent from the carbon bed. Many solvents hydrolyze in the presence of water or steam at high temperatures and the activated carbon acts as a catalyst for these hydrolysis reactions (Kohl, A. and F. Riesenfeld, *Gas Purification* 3rd Edition, Gulf Publishing Co., Houston, (1979)).

Conventional liquid absorption systems are too bulky and costly for processes with small or large air flow. For small air flow, the capital cost of air absorption apparatus is not cost effective; for large systems, the scale-up is difficult. In addition, absorption systems are subject to flooding, loading, entrainment, etc.

Incineration is an unattractive method because of the very dilute concentrations of volatile organic compounds in the air and the possibility of forming chlorinated compounds like dioxin (Armand, B. L.; H. B. Uddholm; and P. T. Vikstrom: "Absorption Method to Clean Solvent-Contaminated Process Air," Ind. Eng. Chem. Res., 29, 436 (1990)). The incineration method also requires supplemental fuel-firing unless the volatile organic compound concentration is quite high.

Another method for removing volatile organic compounds from air applies a vacuum to one side of a permselective membrane. Nonporous polymeric rubbery membranes are highly selective for volatile organic compounds (Peinemann, K. V.; J. M. Mohr; and R. W. Baker: "The Separation of Organic Vapors from Air", AIChE Symp. Ser., 82 (250), 19 (1986)). Using this method, however, it is difficult to bring the volatile organic compound concentration below 200 ppm. A further disadvantage to this method, if an air/$N_2$ selective membrane is used, is that Air/$N_2$ has a very low permeability through most membranes. As a result, the membrane area must be very large so as to provide adequate permeation. The cost of such a large membrane area would be very high.

A further method for removing volatile organic compounds from air uses biofilters. One known disadvantage to this method is that the microorganisms, if available, usually metabolize a specific compound or class of compounds; they cannot metabolize arbitrary volatile organic compound mixture. An enormous amount of research and development will be required to determine whether microorganisms can effectively reduce the volatile organic compounds in air to a level of 1–5 ppm.

Hollow fiber devices have been used to strip volatile species from water (Zhang, Qi and E. L. Cussler: "Microporous Hollow Fibers for Gas Absorption", J. Membrane Sci., 23 321 (1985); Semmens, M. J.; R. Qin; and A. Zander: "Using a Microporous Hollow Fiber Membrane to Separate VOCs from Water", Journal AWWA, April, 162 (1989)), or absorb gases in aqueous solutions (Zhang, Qi and E. L. Cussler: "Microporous Hollow Fibers for Gas Absorption", J. Membrane Sci., 23, 321 (1985); Karoor, S. and K. K. Sirkar: "Gas Absorption Studies in Microporous Hollow Fiber Membrane Modules", Ind. Eng. Chem. Res., 32, 674 (1993)). In conventional hollow fiber gas-liquid contactors, the pore is usually gas filled and the absorbent does not wet the hydrophobic fibers. The absorbent, in the conventional systems, is at a pressure higher than that of the gas, and the gas-liquid contacting interface at the pore mouth is on the liquid side of the fiber (Zhang, Qi and E. L. Cussler: "Microporous Hollow Fibers for Gas Absorption", J. Membrane Sci., 23, 321 (1985)).

Other devices permit nondispersive gas absorption using an aqueous nonwetting absorbent in the pores of the microporous hydrophobic fiber and the gas phase at a higher pressure (Karoor, S. and K. K. Sirkar: "Gas Absorption Studies in Microporous Hollow Fiber Membrane Modules", Ind. Eng. Chem. Res., 32, 674 (1993)). In that device, the absorbent had to be introduced by a complicated exchange process since it was nonwetting.

Other efforts using nonporous hollow fibers for nondispersive gas-liquid contacting for volatile organic compound scrubbing or removal by an organic wetting liquid have failed due to an inadequate understanding of the role of phase pressure (Jansen, A. E.; P. H. M. Feron; J. J. Akkerhuis; and B. P. T. Meulen: "Vapor Recovery from Air with Selective Membrane Absorption", Paper presented at ICOM '93, Heidelberg, Germany, Sep. 2, 1993).

The prior art includes a number of separation devices. These devices perform satisfactorily for their purpose, however, there is room for improvement.

U.S. Pat. No. 4,750,918 to Sirkar, issued Jun. 14, 1988, relates to an apparatus which permits a gas to be selectively transferred from a feed gas mixture to an output fluid. This device does not provide a means for regenerating the output fluid so as to permit its reuse.

European Patent Publication No. 0430331A1 relates to a method for removing organic compounds from air by flowing air on one side of a membrane and flowing a liquid in which the organic compounds are highly soluble in a countercurrent direction on the other side of the membrane.

U.S. Pat. No. 4,973,434 to Sirkar et al., issued Nov. 27, 1990, relates to a single-ply immobilized liquid membrane, which is immobilized within a hydrophobic microporous support, and the process for making such a membrane.

U.S. Pat. No. 4,789,468 to Sirkar, issued Dec. 6, 1988, relates to an apparatus for liquid—liquid solute-transfer. The apparatus consists of a feed solution chamber, a liquid extractant chamber, and a pressure difference regulator. In operation, the feed solution is pumped into the feed solution chamber at a substantially constant rate under pressure. The extractant is pumped into the extractant chamber at a controlled pressure. The feed solution contacts one side of the porous membrane. Pressures of the feed solution and the extractant are imposed in directions and magnitude to substantially immobilize the interface between the feed solution and the extractant at the porous membrane. The solute passes through the pores of the membrane into the extractant. The extractant is then discharged from the housing.

U.S. Pat. No. 4,921,612 to Sirkar, issued May 1, 1990, relates to an asymmetrically-wettable porous membrane and a process for transferring solute from a liquid feed solution to a liquid extractant, which is substantially immiscible with the feed solution. The housing of the unit has an asymmetrically-wettable porous membrane which divides the interior of the housing into a feed chamber, into which a feed solution is pumped then discharged, and an extractant chamber, into which an extractant is pumped then discharged. The side of the membrane facing the feed solution chamber is hydrophilic whereas the side of the membrane facing the extractant chamber is hydrophobic. Pores in the membrane permit communication between the feed solution and the extractant. The solute diffuses into the extractant. The extractant containing the solute is then discharged from the unit. This device does not provide a means for regenerating the extractant.

U.S. Pat. No. 5,053,132 to Sirkar, issued Oct. 1, 1991, is a continuation of the previously discussed patent which relates to the asymmetrically-wettable porous membrane.

U.S. Pat. No. 5,198,000 to Grasso et al., issued Mar. 30, 1993, relates to a method and apparatus for removing volatile compounds from a contaminated gas stream.

The citation of any reference herein should not be deemed an admission that such reference is available as prior art to the invention.

SUMMARY OF THE INVENTION

The present invention provides a system for transferring a solute from a feed gas mixture to an absorbent liquid. The system comprises an absorption module, a pressure control means and a regeneration module. The absorption module contains a porous membrane. The pores of the membrane are wetted by the absorbent liquid contacting the feed gas mixture. The gas-liquid contact at the pore mouth is on the gas side of the fiber. The pressure within the absorption module is controlled so that the interface between the gas feed mixture and the liquid absorbent is substantially immobilized at the membrane to effectively prevent the formation of a dispersion of gas feed mixture and liquid absorbent in either chamber. The regeneration module contains a nonporous material which divides the regeneration module into a liquid absorbent chamber and a vacuum atmosphere chamber. A vacuum outlet port communicates with the vacuum chamber.

In a specific embodiment, the present invention comprises two hollow fiber devices which resemble shell and tube-type heat exchangers. In the first hollow fiber device, contaminated gas-feed mixtures containing solutes are fed inside a plurality of hollow fibers with microporous walls. A suitable liquid absorbent, with a high solubility for the solute, is pumped countercurrently over the outside of the fibers. The solute partitions from the gas-feed mixture into the liquid absorbent where its concentration increases. The absorbent containing solute is transferred into a second hollow fiber device. The second hollow fiber device contains a plurality of hollow fibers with nonporous walls. The solute is recovered and the absorbent is regenerated by applying a vacuum through the lumen of the fibers.

Since the absorbents can be inert, nontoxic and essentially nonvolatile, they can be reused.

The present invention satisfies the need in this field for a simple, cheap and reliable method of removing volatile organic compounds from air gases or $N_2$ which can be used on any scale. The present invention uses efficient compact hollow fiber absorbers to remove volatile organic compounds from $N_2$ and recovers these volatile solvents for recycle by vacuum in a hollow fiber membrane regenerator for subsequent condensation, thus reducing air pollution. Both the solutes and the absorbent liquid used to remove the solute, can be reused after separation. This method is more efficient than incineration of volatile liquid compounds in air with respect to the ultimate destruction of volatile liquid compounds because a much smaller volume of liquid is to be incinerated. Another advantage is that the recovered volatile organic compounds can directly act as a fuel requiring no supplemental fuel firing.

It is a primary object of this invention to provide various industries with a more efficient apparatus for reducing emissions.

Another object of this invention is to provide various industries with an apparatus for reducing emissions which is cost effective.

A third object of this invention is to provide an apparatus which removes solutes from gaseous mixtures by use of a liquid absorbent and simultaneously regenerates the liquid absorbent.

DETAILED DESCRIPTION OF THE INVENTION

Figure 1:
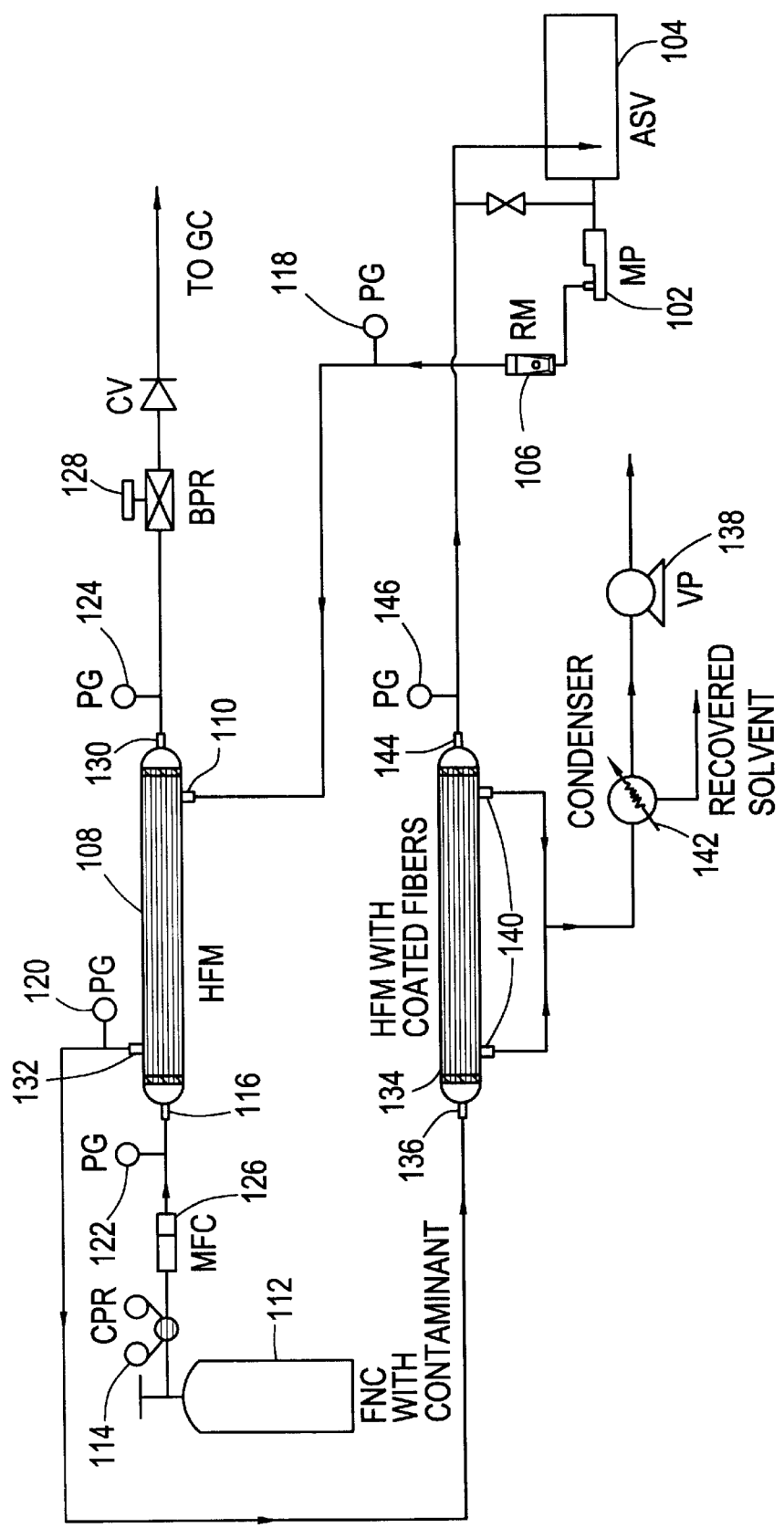
FIG. 1 is a schematic diagram of a combined volatile organic compound absorption/regeneration system.

The present invention for removing vaporizable solutes from gaseous mixtures and collecting the solutes in condensed form is comprised of an absorber module and a regeneration module. Within the absorber module is a porous membrane. The porous membrane may have an ultrathin but highly solute-permeable plasma polymerized nonporous silicone skin on its outside surface. On one side of the porous membrane the gaseous mixture flows and on the other side of the porous membrane flows the liquid absorbent in a countercurrent or crosscurrent direction. A pressure difference is maintained between the gaseous feed mixture and the liquid absorbent. This pressure difference immobilizes the interface between the gaseous feed mixture and the liquid absorbent at the pore mouth of the porous membrane. There is no dispersion of the gas or liquid in the other phase.

The regeneration module contains nonporous membrane that is selectively permeable to the solute. In a preferred aspect, a porous membrane with an ultrathin but highly solute-permeable plasma polymerized nonporous silicone skin on a surface is used. In a specific embodiment, the skin is on the outside of the membrane. In another embodiment, a nonporous material can be formed as a capillary. On one side of the membrane, the absorbent containing solute flows. A vacuum is applied to the other side. Preferably, the absorbent liquid flows on the outside of the membrane, and the vacuum is applied to the lumen. The reverse is also possible. Thus, in a preferred aspect, the porous membrane with an ultrathin plasma polymerized nonporous silicone skin contacts the liquid extractant and is permeable to the solute.

As used herein, the term "solute" refers to, for example, volatile organic compounds. Specific examples of volatile organic compounds include toluene, xylene, acetone, trichloroethylene, trichloroethane, methanol, ethanol, methyl ethyl ketone, carbon tetrachloride, isobutanol, chlorobenzene, pentane, hexane, octane, fluorinated hydrocarbons (CFC-11, CFC-12, CFC-113, CFC-114, CFC-115, etc.), HCFC ($C_2HCl_2F_3$), perchloroethylene, to mention but a few. Those skilled in the art will recognize the above list of examples is not exhaustive.

The source of the gas-feed mixture containing a gas stream and volatile organic compounds may be, for example, air stripping product streams, centrifugal purge/inerting systems, degreasing of metal parts, dry cleaning stores, printing and painting facilities, propellant manufacturing operations, soil decontamination facilities, ventilation systems and gasoline transfer terminals. The gas stream may be, for example, air, $N_2$ $O_2$, $CO_2$, methane, argon, and helium. Those skilled in the art will recognize the above list of examples is not exhaustive.

The term "porous membrane" or "microporous membrane" refers to a hydrophobic, a hydrophilic, or an asymmetric (hydrophobic on one surface and hydrophobic on the other) material containing pore having a diameter between 1 nm to about 10 $\mu$m. The pores allow the gas-feed mixture and the liquid absorbent to form an interface. The pores are spontaneously wetted when they fill with liquid absorbent. Preferably, the membrane is provided in the form of a hollow fiber. A porous membrane thickness is the range of about 5–50 $\mu$m is preferred.

The term "ultrathin" when referring to the thickness of a highly solute-permeable plasma polymerized nonporous silicone skin on the outside surface of the porous membrane means approximately 0.1 $\mu$m to 10 $\mu$m; preferably about 1 $\mu$m. This ultrathin nonporous skin is a significant barrier to permeation for the higher molecular weight absorbent molecules. The skin developed by plasma polymerization on the microporous substrate develops an integral bonding with the substrate which has a much greater resistance to solvent swelling than conventional silicone rubber coatings. Examples of ultrathin nonporous skin include rubbers like dimethylsilicone, copolymers of silicone-polycarbonate, poly (1-trimethyl silyl-1-propyne), fluoroelastomers, polyurethane, and polyvinylchloride, to mention a few.

The term "highly solute-permeable plasma polymerized nonporous silicone skin membrane" refers to a hydrophobic, hydrophilic, or an asymmetric (hydrophobic on one surface and hydrophilic on the other) material which is nonporous and provides a significant barrier to permeation for absorbent molecules. The molecular weight of solute molecules is considerably less than the molecular weight of the absorbent molecules. The nonporous membrane is much more permeable to the solute molecules than the absorbent molecules as a result. Preferably, the membrane is provided on the outer surface of a hollow fiber.

The term "hydrophobic" describes a substance which does not absorb or adsorb water. Preferred hydrophobic membranes include porous polyethylene, porous polypropylene, porous polyamides, porous polyimides, porous polyetherketones, porous polyvinylidene fluoride, porous polyvinylchloride, porous polysulfone, porous polyethersulfone, and porous polytetrafluoroethylene (PTFE). In a specific embodiment, the hydrophobic membrane is a porous propylene membrane, CELGARD (Hoechst Celanese, SPD, Charlotte, N.C.). These membranes may be isotropic (like CELGARD), or they may be asymmetric, as in ultrafiltration membranes. In an embodiment of the invention, the hydrophobic membranes may be CELGARD X-10 and CELGARD X-20. Those skilled in the art will recognize that the above list of examples is not exhaustive.

The term "hydrophilic" describes a substance that readily associates with water. Preferred hydrophilic membranes include porous regenerated cellulose, porous cellulose acetate, porous cellulose acetate-nitrate, porous cellulose triacetate, microporous glass, porous porcelain, and polyacrylonitrile, to mention a few. Those skilled in the art will recognize that the above list of examples is not exhaustive.

The term "absorbent liquid" refers to a liquid that can be used to form a liquid membrane. The absorbent liquid may be any high boiling, inert, nonvolatile, organic absorbent which has a very low vapor pressure. The absorbent liquid may or may not be water insoluble. Examples of suitable absorbent liquids are dimethyl/polymethyl siloxanes, mineral oils, paraffinic oils, vegetable oils, heat transfer fluids, aqueous solutions of alkanolamines, hindered amines, pure polar hydrocarbons (n-methylpyrollidone, dimethylsulfoxide, sulfolane, etc.), and synthetic hydrocarbon solvents. More specifically, the examples may include silicone oil, Paratherm, Syltherm, Dowtherm, Calflo, Therminol, Syntrel, Isopar, and Norpar.

A specific embodiment of the invention is shown in FIG. 1. Regenerated absorbent liquid is transported using a pump, 102, from an absorbent storage vessel, 104, through a rotameter, 106, into an absorber module.

FIG. 1 shows the absorption of volatile organic species in absorber module, 108, with the absorbent liquid entering through the liquid absorbent inlet, 110. The absorber module, 108, contains a plurality of microporous hydrophobic fibers.

The gas feed mixture containing volatile organic compounds is housed in a feed cylinder, 112. The cylinder pressure regulator, 114, is released and the gas feed mixture flows into the absorber module, 108, entering through the gas feed inlet, 116. The gas feed mixture flows through the absorber module on one side of the hollow fiber wall and the absorbent liquid flows on the other side. The liquid flow pressure of the absorbent within the absorber module is monitored by use of a pressure gage, 118, on the inlet side of the absorber module and a pressure gage, 120, on the outlet side of the absorber module, 108. Liquid flow rates are controlled by adjusting the stroke-length and the stroke frequency of the pump, 102. The gaseous flow pressure, of the gas feed mixture, is monitored by a pressure gage, 122, on the inlet side of the absorber module and a back pressure gage, 124, on the outlet side of the absorber module. The gas flow rate is maintained using a mass flow controller, 126, and a back pressure regulator, 128. Preferably, the gas pressure and absorbent liquid pressure are controlled by a microprocessor control means.

In a system in which a microporous membrane is used in the absorbent module, the gas feed is maintained at a higher pressure than the pressure of the liquid absorbent. In a specific embodiment, the gas feed is in the range of about 1–10 psig, and the liquid absorbent is at about atmospheric pressure to about 10 psig. However, the absolute pressure of the gas feed and absorbent liquid can be much higher, as long as the gas feed pressure is slightly greater than the liquid absorbent pressure. The maximum difference, the breakthrough pressure, can be calculated as $$\Delta P = 2 \times \frac{\gamma \cos\theta}{R_P}$$

where $\gamma$ is surface tension, $\Theta$ is the wetting angle, and $R_p$ is the pore radius. The pressure difference should be less than this value.

In a system in which the microporous hollow fibers in the absorbent module have a nonporous ultrathin skin, the gas feed pressure cannot be greater than the liquid absorbent pressure. In a specific embodiment, the gas feed pressure and the liquid absorbent pressure are atmospheric.

In another embodiment, the microporous membrane can form a polymeric gel after wetting and swelling with the liquid absorber. More preferably, to avoid weakening of the membrane that can result from swelling, a polymeric gel is formed in the pores of the membrane. Such a gel stabilizes the gas-liquid interface. In one embodiment, an aqueous material can be introduced into the fiber to form a gel inside the hollow fiber. The material is then removed from the lumen of the fiber, but remains in the pores. After contacting the liquid absorbent, the liquid absorbent can replace water in the gel in the pores of the hollow fiber.

The gas feed, which has had the volatile organic compounds removed, exits the absorber module through the gas feed outlet, 130. The volatile organic compound concentrations are measured at a gas chromatograph. The volatile organic compound laden absorbent exits the absorbent module through the absorbent outlet, 132. The liquid absorbent containing volatile organic compounds enters the regeneration module, 134, through the absorbent/volatile organic compound inlet, 136. The regeneration module contains a plurality of microporous hollow fibers having an ultrathin nonporous silicone skin. A vacuum is applied to the lumen of the hollow fibers in the regeneration module by a vacuum pump 138. The volatile organic compounds in the absorbent pass from the liquid absorbent into the membrane, and then into the vacuum. The volatile organic compounds, which have been stripped from the absorbent, exit the regeneration module through two outlets, 140. The volatile organic compounds are condensed in a condenser, 142. The regenerated absorbent, which has been stripped of volatile organic compounds, exits the regeneration module through an outlet, 144, and is returned to the absorbent storage vessel, 104. The pressure of the liquid absorbent is monitored using a pressure gage, 146.

Another apparatus for regenerating volatile organic compound laden absorbent liquid heats the laden absorbent prior to passing the laden absorbent through the regeneration module.

Alternatively, rather than applying a vacuum, a sweep vapor may be applied to draw off the volatile organic compounds which have to be removed from the liquid absorbent. The sweep vapor stream may be condensed into two immiscible layers. One layer may be condensed vapor and the other may be condensed volatile organic compounds. For example, large amounts of steam can be used to strip the volatile organic compounds from the liquid absorbent.

Figure 2A:
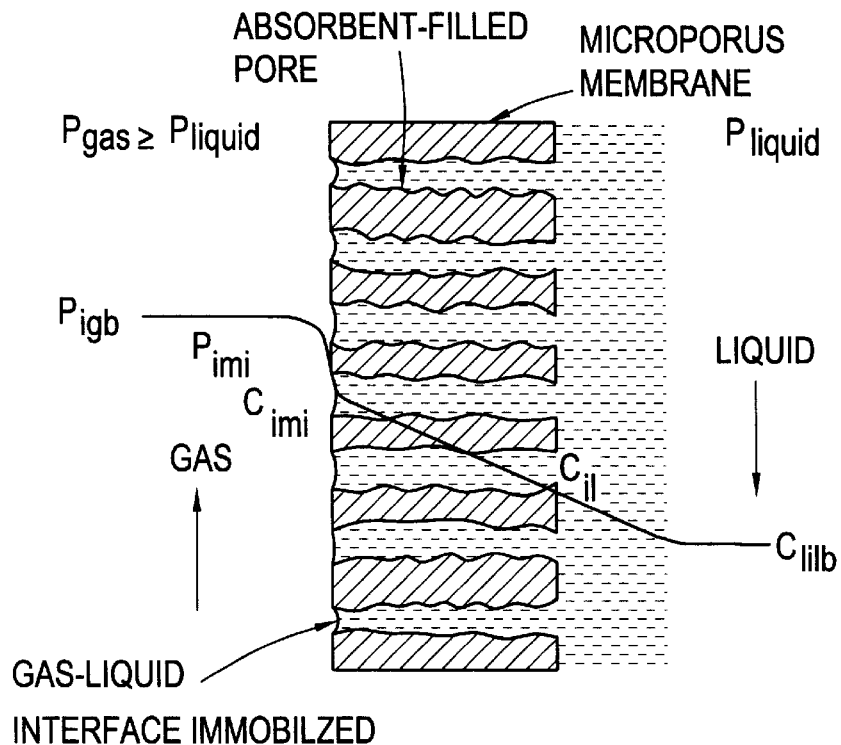
FIG. 2A depicts local partial pressure and concentration profiles of volatile organic compounds being absorbed in a microporous/porous hollow fiber module.

FIG. 2A shows the absorption of volatile organic compounds from a gas-feed mixture by a liquid absorbent at the pores of a microporous hollow fiber. The hollow fibers may be hydrophobic or hydrophilic. The wall of the hollow fiber may be a gel membrane, for example, any polymeric membrane swollen by absorbent liquid. In a preferred embodiment, the microporous hydrophobic hollow fibers may be Celgard X-10 (Hoechst Celanese, Charlotte, N.C.). In a preferred embodiment, the inner diameter and the outer diameters of the hollow fibers are in the range of 50 $\mu$m–500 $\mu$m, respectively.

The absorbent and the gas feed mixture flow in opposite directions on either side of the microporous membrane. In a preferred embodiment, silicone oil 200 fluid (Dow Corning, Midland, Mich.) and Paratherm (Paratherm Corporation, Conshohocken, Pa.) are used. The gas-feed mixture is comprised of a gas stream and volatile organic compounds. The gas stream may be, for example, air, $N_2$ or $O_2$. In a preferred embodiment, acetone, methylene chloride, methanol and toluene are the volatile organic compounds.

In an embodiment in which a hydrophobic membrane is used, and the absorbent liquid wets the membrane including the pore spaces, the gas mixture is maintained at a higher pressure than that of the liquid absorbent, in order to immobilize the liquid absorbent within the pores of the microporous membrane. The liquid absorbent wets or fills the pores of the microporous membrane interfacing with the gas-feed mixture. The volatile organic compounds pass from the gas-feed mixture into the liquid absorbent through the pores of the microporous membrane.

In this embodiment, the surface tension at each pore can be used with the pressure exerted by the gas to keep the phases apart.

Figure 2B:
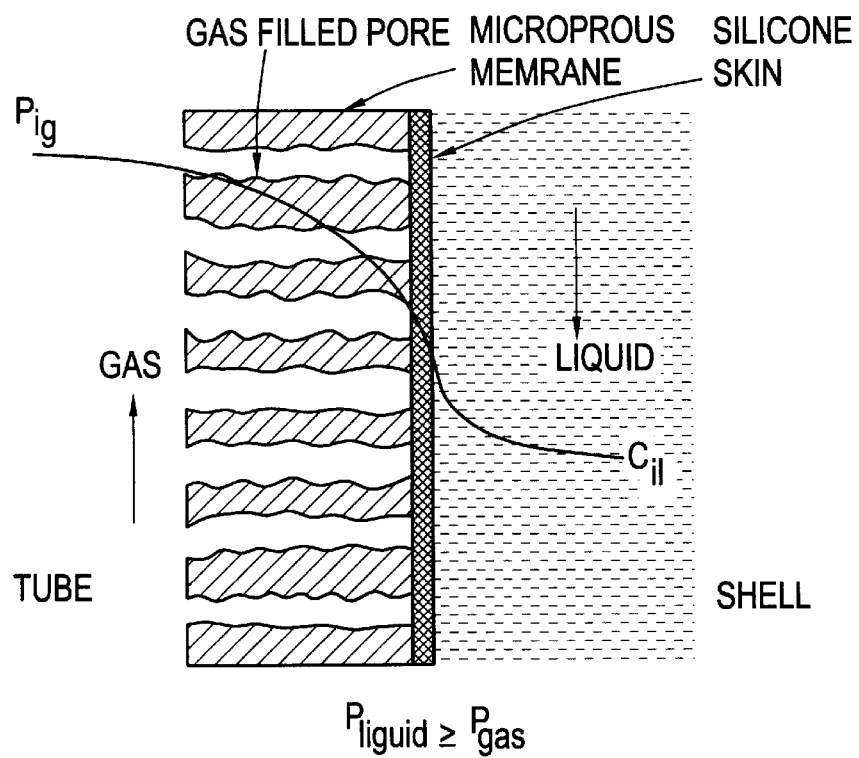
FIG. 2B depicts the local partial pressure and concentration profiles of volatile organic compounds being absorbed in microporous/porous hollow fibers having an ultrathin plasma polymerized nonporous silicone skin.

FIG. 2B shows the absorption of volatile organic compounds from a gas feed mixture by a liquid absorbent at the pores of the microporous hollow fiber tube having an ultrathin plasma polymerized silicone skin. A microporous hydrophobic hollow fiber having an ultrathin, but highly permeable to volatile organic compounds, plasma polymerized nonporous silicone skin, on the outside surface of the hollow fiber (AMT, Inc., Minnetonka, Minn.) may be used. In a preferred embodiment, the ultrathin plasma polymerized layer of silicone may be, for example, ~1 $\mu$m thick. The hydrophobic microporous fiber, in a preferred embodiment, using the ultrathin plasma polymerized layer of silicone has an inner diameter and outer diameter in the range of 50 $\mu$m–500 $\mu$m.

In the embodiment shown in FIG. 2B, the liquid absorbent flow pressure is maintained at higher or equal pressure with respect to the pressure of the gas-feed mixture. This pressure difference is necessary to prevent gases from easily permeating through the silicone skin and bubbling through the flowing organic solvent. If this occurred, gas bubbles get saturated with volatile organic compounds and would need to be recycled back to the gas feed stream after disengagement from the organic solvent at the end of the module.

Since the thin silicone is nonporous, there is reduced contamination of the gas-feed stream by the liquid extractant than in previous devices. The skin used in the present invention is intrinsically different from conventional silicone rubber coatings applied onto microporous fibers. Because plasma polymerization on the microporous hollow fiber substrate develops an integral bonding with the substrate, the result is a much greater resistance to solvent swelling than is provided by conventional silicone rubber coating.

EXAMPLES

Membranes and Modules

Two types of hollow fiber membranes were used. The first type was hydrophobic microporous polypropylene Celgard® X-10 fiber (Hoechst Celanese, Charlotte, N.C.), having 100 $\mu$m I.D. and 150 $\mu$m O.D. The second type was a hydrophobic microporous polypropylene fiber of 240 $\mu$m I.D. and 300 $\mu$m with an ultrathin (~1 $\mu$m) plasma polymerized nonporous layer of silicone on the outside surface (AMT, Inc., Minnetonka, Minn.). A number of parallel flow modules were made using these two types of fibers. The geometrical characteristics of these modules, the properties of the fiber used and the fiber surface area information are provided in Table 1.

TABLE 1

GEOMETRICAL CHARACTERISTICS OF DIFFERENT HOLLOW FIBER MODULES USED

| Module No. | Type of Fiber | Fiber ID (cm) | Fiber OD (cm) | Effective Length (cm) | Shell ID (cm) | No. of Fibers | Void Fraction (%) | Mass Transfer Area (cm$^2$) | Mass Transfer Area/Volume (cm$^2$/cm$^3$) |
|---|---|---|---|---|---|---|---|---|---|
| 1 | Celgard* X-10 | 0.01 | 0.015 | 35.7 | 0.60 | 600 | 62.5 | 1009.40 | 100.00 |
| 2 | Celgard X-10 | 0.01 | 0.015 | 31.0 | 0.37 | 102 | 83.23 | 149.00 | 44.70 |
| 3 | Celgard** with a silicone skin | 0.024 | 0.030 | 20.5 | 0.80 | 300 | 57.81 | 579.62 | 56.25 |

*Hoechst Celanese SPD, Charlotte, NC.
**AMT Inc., Minnetonka, MN.

Module Fabrication

In this study, shell-and-tube type of modules were fabricated using the hollow fibers mentioned above. The shell was made from stainless steel tube/pipe having a male run tee connected at each end. The epoxy used for potting the fibers was Armstrong C-4 epoxy with D activator (Beacon Chemicals, Mt. Vernon, N.Y.) mixed in the ratio of 4:1 of epoxy to activator.

A predetermined number of fibers were counted first and arranged in the form of a bundle on a table. Both ends of the bundle thus made were tied with a thread. This bundle was carefully inserted inside the shell by pulling the thread connected to one end of the fiber bundle through the shell. Insertion of fiber inside the shell was done by first immersing the shell in water to reduce friction. The fiber length was selected such that about 2 inch length of fibers remained outside the end fittings at both ends of the module. The fibers were then dried by applying vacuum for about 24 hours. The ends of the fittings were first sealed with silicone rubber (RTV 118, General Electric, Waterford, N.Y.). It was then allowed to cure for about two hours. The epoxy and activator were then mixed thoroughly and the mixture was degassed by applying vacuum for about four to five minutes. This mixture was then poured through the shell side opening at one end until the lower portion of the male run tee was full. The epoxy was allowed to cure for about 10 hours by keeping the module vertical. The other end of the module was potted in a similar way. When epoxy was completely cured, a leak test was performed with water in the shell-side under 20 psig pressure.

Modules for silicone skinned Celgard® fibers for absorption and stripping experiments were prepared in a similar way. However, one additional potting layer of silicone rubber, RTV 615 A&B (GE Silicones, Waterford, N.Y.) was essential as epoxy did not bond well with the silicone coating of the fiber. This layer was put between the other two layers of pottings.

Chemicals and Gases

The absorbents used were silicone oil 200 fluid obtained from Dow Corning (Midland, Mich.) and Paratherm NF® supplied by Paratherm Corporation (Conshohocken, Pa.). Their properties are listed in Table 2. Paratherm NF® oil is mineral oil based. It is very stable and has an extremely low vapor pressure.

TABLE 2

PROPERTIES OF ABSORBENTS

| Properties | Absorbent Liquid | |
|---|---|---|
| | Silicone Oil | Paratherm NF ™ |
| Chemical Name | Polydimethylsiloxane | — |
| Molecular Weight | 300 (avg) | 350 (avg) |
| Density | 0.98 @ 77° F. | 0.87 gm/cc @ 77° F. |
| Viscosity | 50 cs @ 77° F. | 35 cp @ 77° F. |
| Vapor Pressure | <5 mm Hg @ 77° F. | 0.001 mm Hg @ 100° F. |
| | | 0.026 mm Hg @ 200° F. |
| Surface Tension | — | 28 dynes/cm @ 77° F. |
| Flash Point | 605° F. | — |
| Pour Point | −94° F. | −45° F |
| Melt Point | −42° F. | — |
| Refractive Index | 1.402 | 1.4768 |
| Appearance | Colorless, clear liquid | Colorless, clear liquid |
| Other Properties | Nontoxic, nonbioactive, nonstinging to skin, high oxidation resistance | Nontoxic, FDA/USDA approved for use in food and pharmaceuticals |

The VOC-$N_2$ mixture for each individual VOC was obtained in primary standard cylinders from Matheson (993 ppmv for acetone, 999 ppmv for methylene chloride, 514 ppmv for methanol and 236 ppmv for toluene (certified standard)). Additional mixtures were developed by careful blending of this primary standard gas mixture and $N_2$-zero gas (99.99% $N_2$) in predetermined ratios via two electronic mass flow transducer-controllers.

Experimental Setup and Procedure for Absorption

Figure 3:
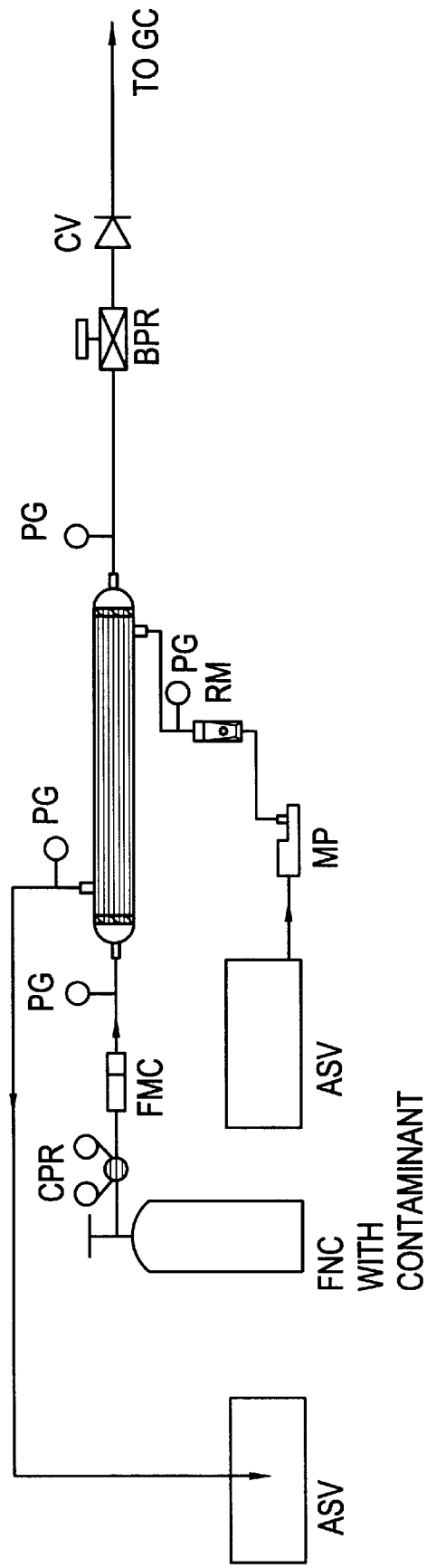
FIG. 3 is a schematic diagram of a volatile organic compound absorption system.
Figure 4:
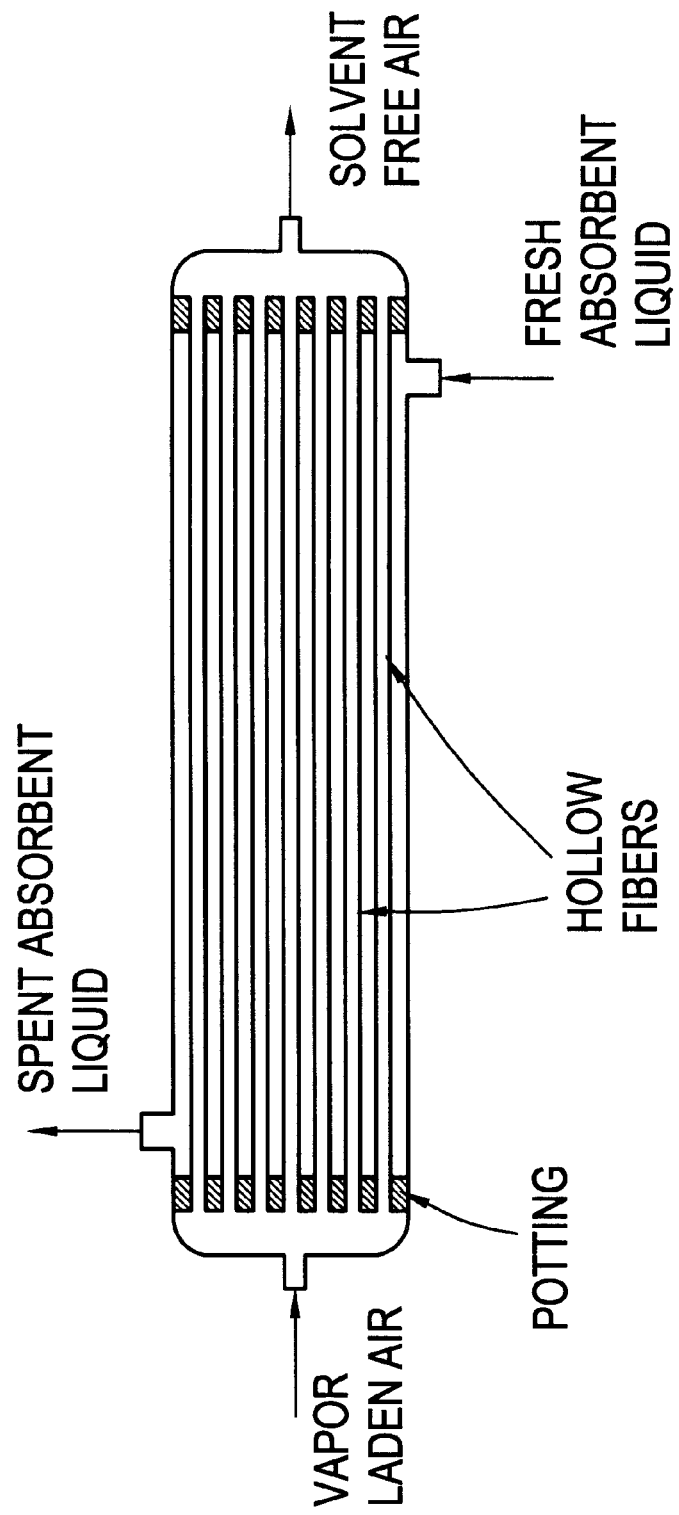
FIG. 4 is a cross-sectional view of a hollow fiber module with microporous fibers.

The experimental setup for gas absorption is shown in FIG. 3. The fresh absorbent from a covered glass container acting as the absorbent storage vessel was pumped by an electronic metering pump (model 10313M, LMI, Milton Roy, Acton, Mass.) through the shell-side of the hollow fiber module. A pulse dampener was used at the pump discharge end to eliminate flow pulsations. Liquid flow rates were controlled by adjusting the stroke-length and the stroke-frequency of the pump. The spent absorbent liquid was collected in a separate vessel. The VOC-containing feed gas mixture was sent from a cylinder through the fiber bores countercurrent to the absorbent flow into a gas chromatograph (GC). Prior to entering the membrane module, the gas was passed through an electronic mass flow transducer and a flow controller (Matheson, E. Rutherford, N.J.). Beyond the membrane module, the gas was passed through a back pressure regulator into the GC to maintain an appropriate level of gas pressure in the module.

In experiments employing an absorption module made of microporous hydrophobic Celgard® X-10 membranes, the gas-phase pressure was always maintained higher than the liquid pressure. In most experiments, the tube-side outlet pressure of gas was maintained at around 3 psig by means of the back pressure regulator. In some experiments values as low as 1 psig were maintained. Prior to the first experiment with a module, the absorbent liquid was poured into the shell-side to wet the fibers. For continuing experiments, the tube-side gas pressure is kept under pressure during the gap between experiments. All experiments were done at room temperature (23±1° C.).

When an absorption module made of microporous hollow fibers having a nonporous ultrathin skin was used for gas absorption experiments, the pressures of the gas phase and the liquid phase were essentially atmospheric. The gas and the liquid flows were countercurrent. A few experiments were done using the gas pressure at a level considerably higher than that of the liquid to explore the deficiencies of such a condition.

In any given experiment, after the liquid and the gas flow rates were adjusted, concentration measurement of the gas stream exiting the module was begun via the GC. A specific experimental run for a given liquid and gas flow rate was continued until the exiting gas composition was found to be constant. The time required for this varied between 15 minutes to 1 hour depending on the VOC and the flow rates. The liquid or the gas flow rate was changed only after a steady state was reached. The gas composition was measured by a FID in a Varian 3400 Star GC using a column containing 0.3% Carbowax 20M on a Carbopack C support (Varian Analytical Services, Sunnyvale, Calif.).

Experimental Setup and Procedure for Combined Absorption-Stripping of VOC

The schematic diagram of the experimental setup for combined absorption-stripping is shown in FIG. 1. Regenerated absorbent liquid was pumped (MP) from a small glass container (ASV) to the shell side of the absorber module (HFM) containing microporous fibers for absorbing VOC from VOC-$N_2$ feed gas mixture flowing through the tube side of the module countercurrently with respect to the absorbent flow. The absorbent exiting from the absorber was connected to the shell side of the stripper hollow fiber module based on fibers having a nonporous silicone skin. Vacuum pump (VP) was connected to the tube side of the stripping module via a condenser. The purified absorbent liquid from the stripper was recycled back to the absorbent storage vessel. This vessel was tightly closed to avoid any VOC escape from the holdup liquid. The gas outlet from the absorber was connected to the GC via a back pressure regulator. The GC outlet was connected to the bubble flow meter for manual measurement of the gas flow rate. Finally, the exit gas was vented out through a laboratory fume hood.

Before starting the first experiment, the absorber module was filled with the absorbent to wet the membrane as in absorption runs. Then the VOC-$N_2$ gas mixture flow was switched on at a predetermined flow rate through the tube side of the absorber module. The constant gas flow rate was maintained and monitored by means of an electronic mass flow transducer and controller. The tube side gas pressure at the outlet of the absorber was maintained at 3 psig by adjusting the back pressure regulator. The absorbent circulation pump was then started. First the liquid flow rate was measured manually by collecting the liquid in a measuring cylinder in a definite period of time from the outlet of the stripper module. Once the liquid flow rate was set, the stripper outlet liquid line was connected to the absorbent storage vessel. The amount of liquid inside this vessel was in excess of the amount required to fill the pump suction line and the hold-up volume of the setup. The amount of circulation liquid was kept at the lowest possible level in order to reduce the time required to achieve the steady state. After some time, the absorbent storage vessel may be bypassed. The VOC concentration of the exiting gas was monitored every hour. Time taken to attain a steady state composition of VOC at the absorber outlet was found to be approximately 7 to 8 hours. The procedure was repeated for different gas flow rates. All experiments for VOC absorption as well as VOC absorption-stripping were done with the gas at essentially atmospheric pressure except for the needed pressure difference.

Calculation of Mass Transfer Coefficient in Gas Absorption

The overall gas-phase based mass transfer coefficient, $K_{OG}$, for any VOC absorption experiment has been defined by the following expression:

$$K_{OG} = \frac{P_m V_m \times 10^{-9}}{RT \times 14.7 \times 60} \frac{(ppmv_1 - ppmv_2)}{A_m (\Delta C)_{1m}} \frac{\text{cm}}{\text{sec}} \quad (1)$$

where  $ppmv_1$  is the VOC concentration in gas in ppmv at module inlet $ppmv_2$  in the VOC concentration in gas in ppmv at module outlet $A_m$  is the membrane surface area at the gas-liquid interface, $\text{cm}^2$ $P_m$  is the pressure of the gas at which the volume of gas is measured (psia)

$V_m$  is the volumetric flow rate of gas $\text{cm}^3/\text{min}$ $R$  is the universal gas constant, $0.082 \frac{\text{liter-atm}}{\text{gmol-}^\circ \text{K}}$ $T$  is the absolute temperature, $^\circ$ K.

and  $(\Delta C)_{1m}$  is the logarithmic mean driving force based on gas phase concentration defined by equation (2), $$(\Delta C)_{1m} = \frac{(C_{1g} - C^*_{1g}) - (C_{2g} - C^*_{2g})}{\frac{\ln(C_{1g} - C^*_{2g})}{(C_{2g} - C^*_{2g})}} \quad (2)$$

Here $C_{1g}$ is the molar concentration (mole/cc) of VOC in the gas at module inlet and $C_{2g}$ is that at the module outlet; $C_{1g}^*$ and $C_{2g}^*$ are the hypothetical gas phase concentrations in equilibrium with the absorbent concentrations at the module inlet and the module outlet respectively. The values of $C_{1g}^*$ and $C_{2g}^*$ are obtained from the corresponding liquid phase concentrations of the VOC and the Henry's law constant $H_f$ for the VOC. If we assume that the absorbent phase concentrations of the VOC are quite small and may be neglected, then $$(\Delta C)_{1m} = \frac{C_{1g} - C_{2g}}{\ln\left(\frac{C_{1g}}{C_{2g}}\right)}. \quad (3)$$

RESULTS AND DISCUSSION

The results for VOC-absorption studies in absorbents silicone oil and Paratherm® are presented first. Results for all or some of the VOCs, e.g., acetone, methylene chloride, methanol and toluene are provided for both kinds of membranes (FIGS. 2A and 2B) in terms of the extent of removal of an individual VOC as a function of the feed $N_2$-VOC gas flow rate. Similar VOC removal results as a function of the absorbent flow rate have been shown. Estimates of the VOC mass transfer coefficients have been obtained from such data as a function of the gas and the liquid flow rates.

We have next provided the results for simultaneous absorption-stripping experiments in terms of the cleaned gas composition as a function of the feed gas flow rate for a given absorbent recirculation rate and vacuum level. This will provide a comprehensive basis for adopting such a process for VOC emission control in various large or small processes and operations. Note that we have used equation (2) for defining $(\Delta C)_{1m}$ and, therefore, $K_{OG}$.

VOC Absorption Results

Figure 5:
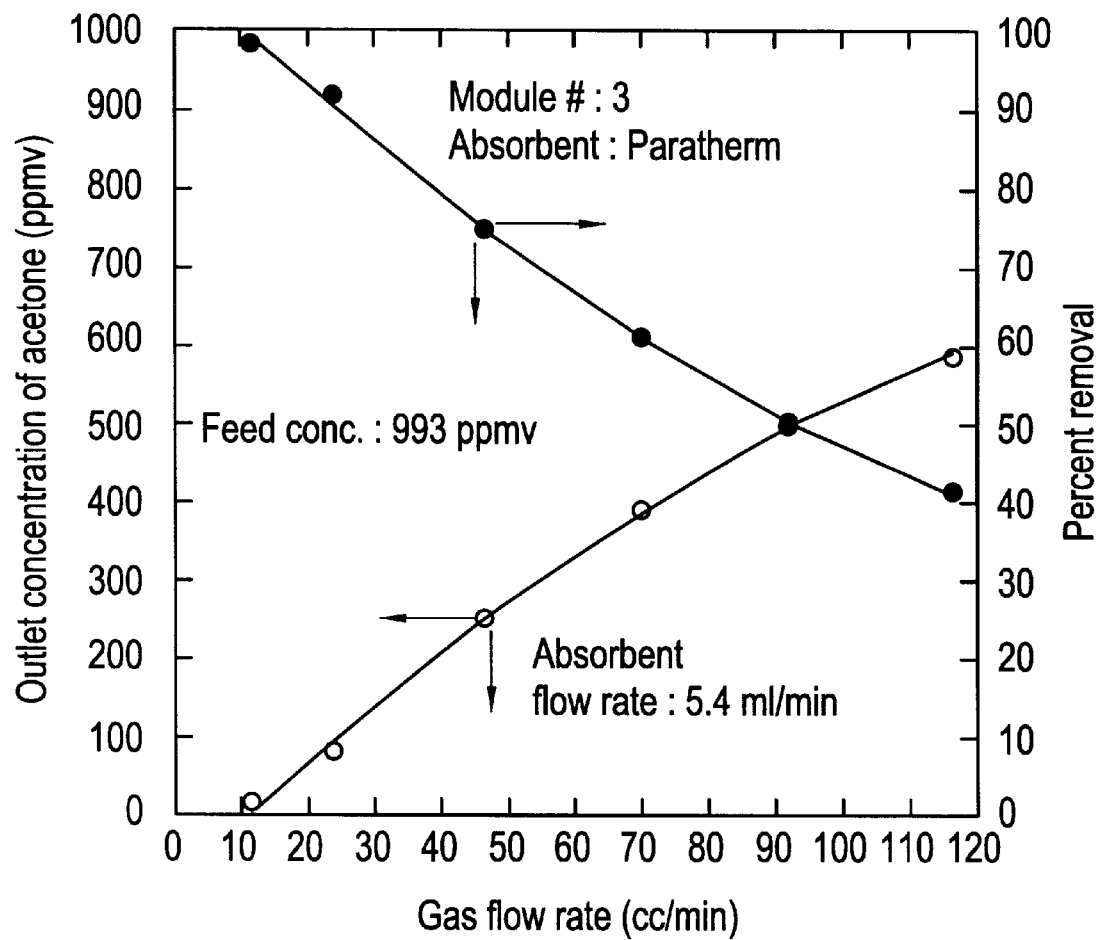
FIG. 5 is a graph illustrating the outlet concentration and percent removal for acetone absorption in experimental module 3.

FIG. 5 illustrates the results of an absorption experiment in which feed gas containing acetone is fed through the bores of module No. 3 (a microporous membrane having a plasma polymerized nonporous skin). Paratherm was used as the absorbent liquid. Both the outlet concentration of acetone in the feed gas and the percent removal of acetone from the feed gas are shown in FIG. 5. In this system, the gas feed pressure never exceeded the absorbent liquid pressure.

Figure 6:
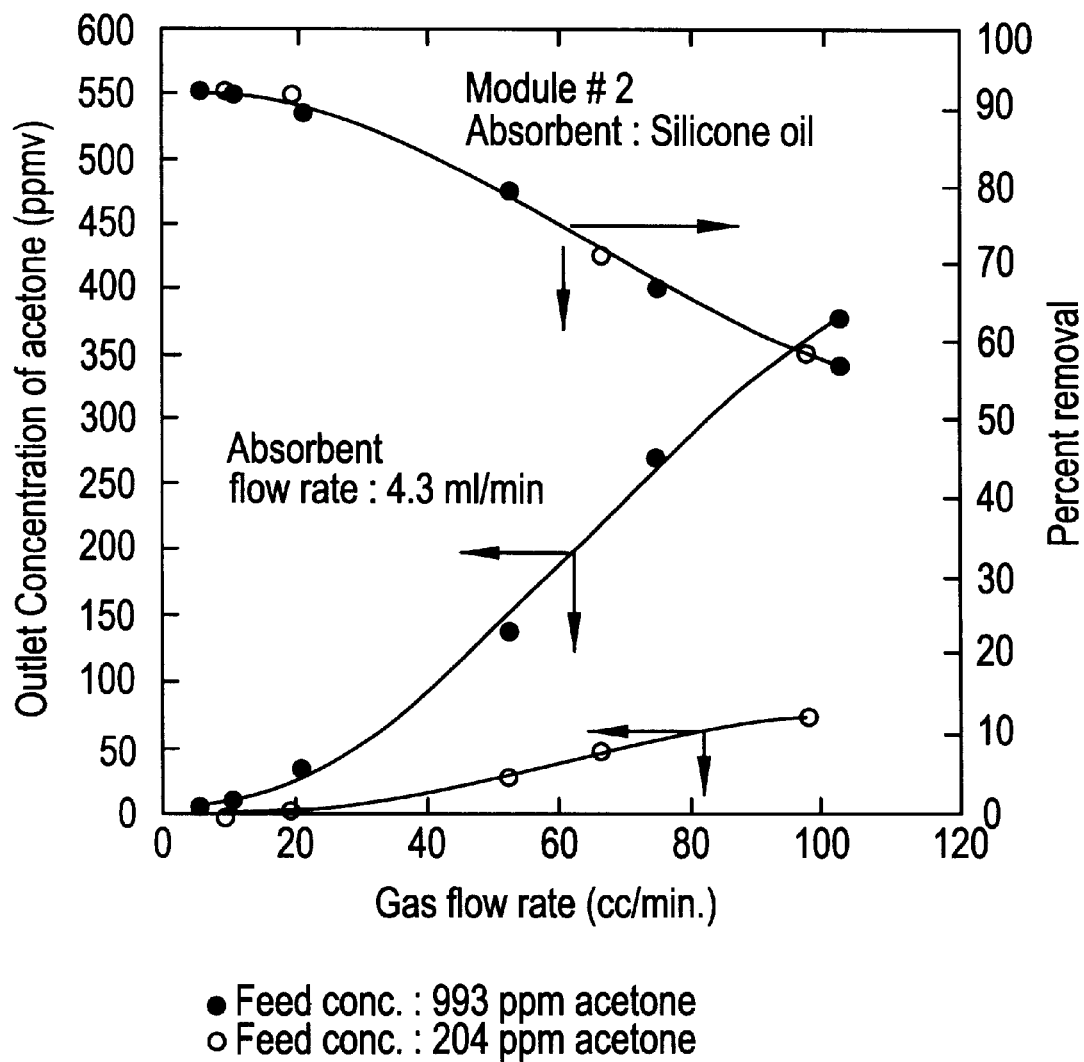
FIG. 6 is a graph illustrating how the concentration of acetone in feed gas mixtures decreases as a function of the feed gas flow rate in experimental module 2 using microporous hollow fibers and silicone liquid as absorbent. Also illustrated is the corresponding percent removal of acetone from the gas stream. The initial concentration of acetone was 983 ppm (solid circle), or 204 ppm (open circle).

FIG. 6 illustrates how the composition of acetone in treated feed gas mixtures changes as a function of the feed gas flow rate through the fiber bores in module No. 2 (microporous membrane) for silicone liquid as absorbent. FIG. 6 also illustrates the corresponding percent removal of acetone from the gas stream. We observe that a feed gas mixture containing 999 ppmv of acetone in $N_2$ can be reduced to as low as 2 ppmv in the treated gas stream exiting the module at low gas flow rates. Thus, 99.5%+removal of the polar VOC, acetone, is possible in a microporous hollow fiber gas-liquid contactor using silicone fluid as the organic absorbent flowing countercurrent to the gas. Note that the pores of the membrane were spontaneously wetted by silicone fluid and the gas pressure was maintained always slightly higher than the liquid pressure.

At the lowest gas flow rates achieving the highest VOC absorption, the gas flow rate per fiber was in the range of 0.1 cc/min/fiber. If the module were longer providing more gas-liquid (and, therefore, membrane) contact area, then higher gas flow rates may be used for equivalent VOC reduction. For lower fractional VOC absorption, say, 90%, a much higher flow rate of 0.4 cc/min/fiber can be maintained continuously. These numbers are very convenient for scaling up VOC scrubbing unless the liquid flow pattern on the shell-side changes very substantially in a scaled up module due to bypassing.

Figure 7:
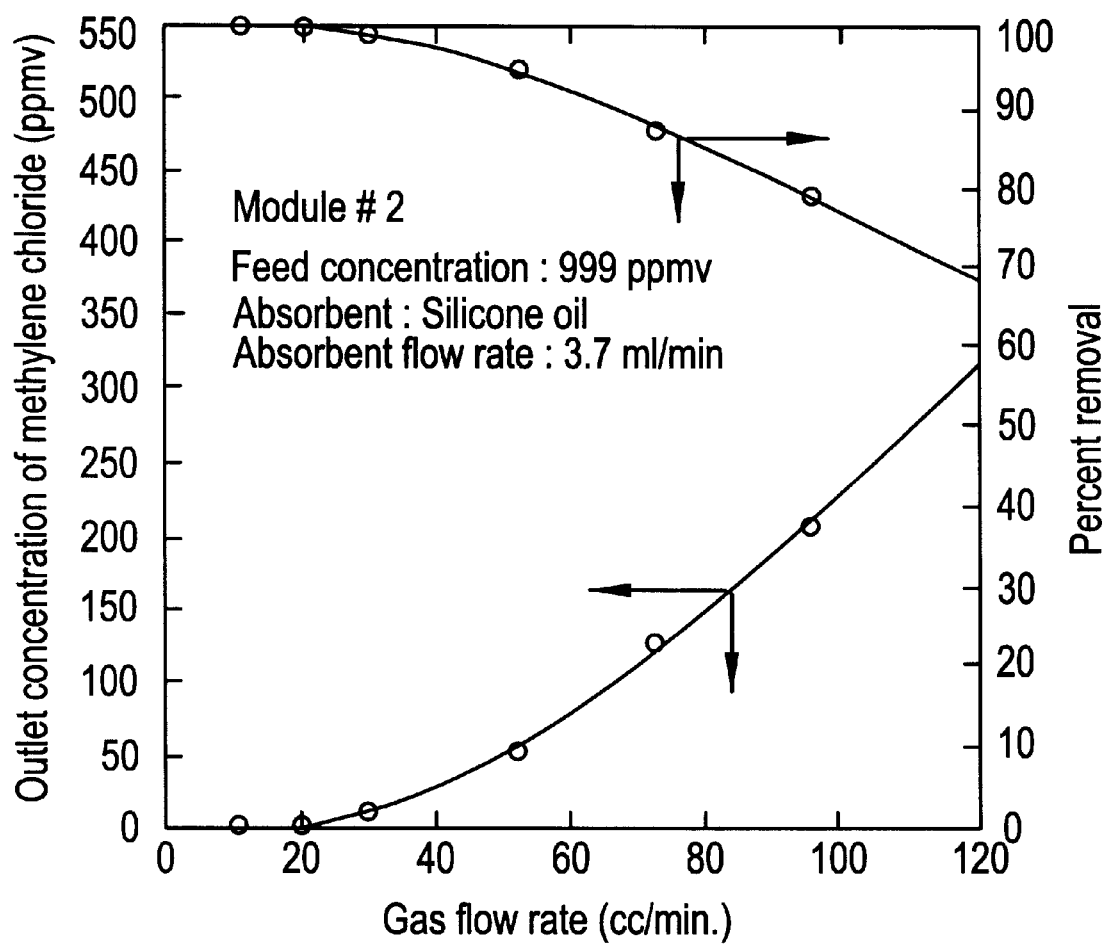
FIG. 7 is a graph illustrating the outlet concentration and percent removal for methylene chloride absorption in experimental module 2.
Figure 8:
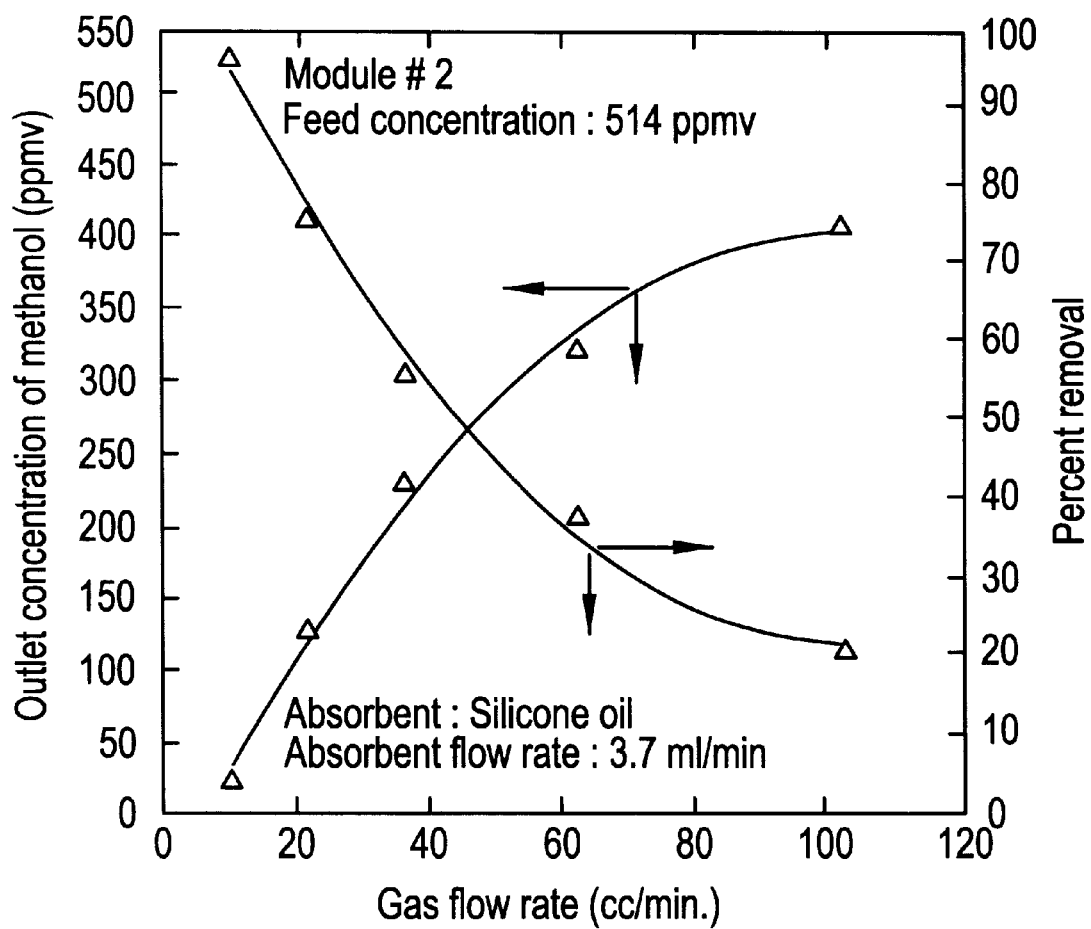
FIG. 8 illustrates the outlet concentration and percent removal for methanol absorption in experimental module 2.
Figure 9:
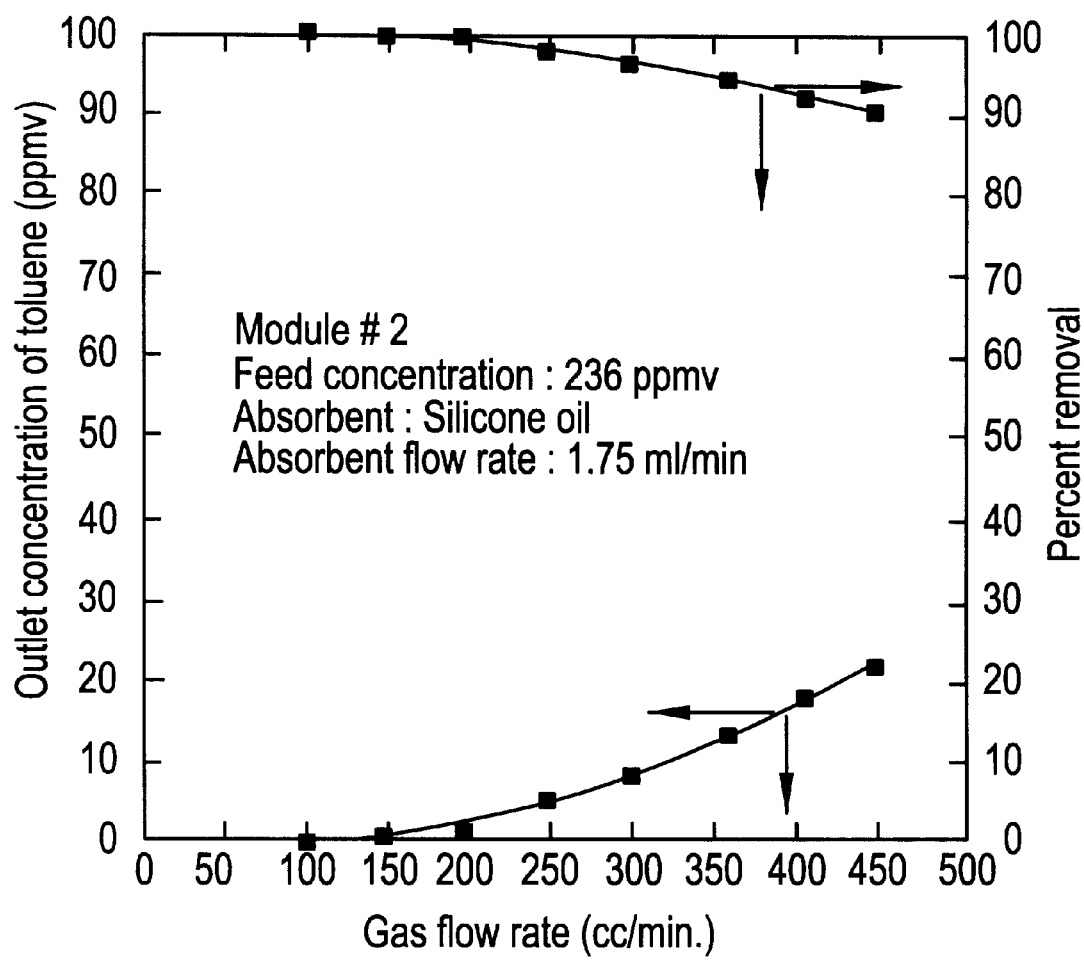
FIG. 9 illustrates the outlet concentration and percent removal in toluene absorption in experimental module 2.
Figure 10:
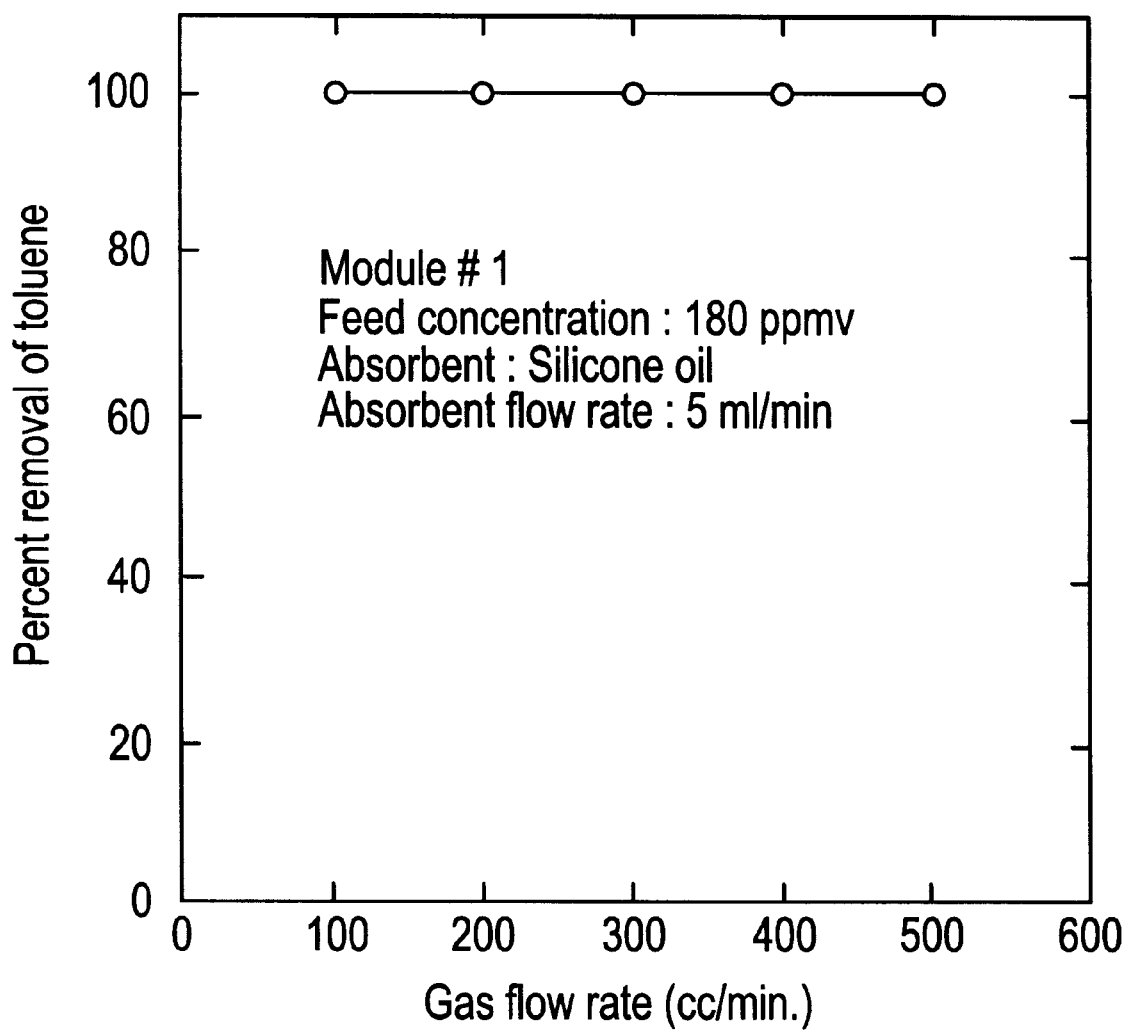
FIG. 10 illustrates the results of toluene removal in experimental module 1.

FIGS. 7, 8 and 9 show respectively the VOC removal capabilities of the same module 2 for methylene chloride (feed concentration, 999 ppmv), methanol (feed concentration, 514 ppmv) and toluene (feed concentration, 200 ppmv) as a function of the feed gas flow rate. It appears that toluene is much more easily removed allowing a much higher gas flow rate per fiber in the range of 1 cc/min/fiber for the highest fractional toluene removal. This figure of 1 cc/min/fiber is reinforced by the results of toluene removal shown in FIG. 10 where the large module No. 1 was utilized and virtually all of the toluene present in the feed gas was removed for much higher gas flow rates.

Figure 11:
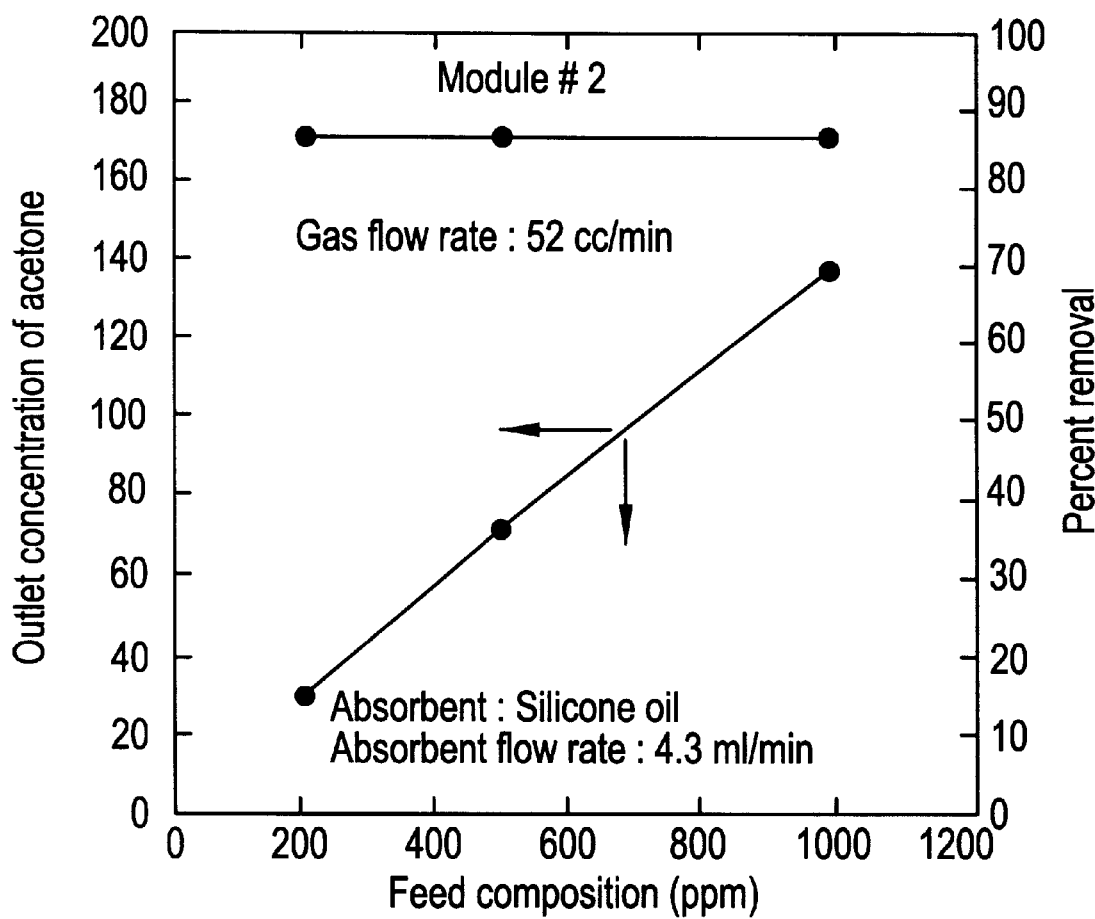
FIG. 11 illustrates acetone removal in experimental module 2 as a function of feed gas composition for a given flow rate and a given silicone absorbent flow rate.

FIG. 11 explores acetone removal in module 2 as a function of feed gas composition for a given gas flow rate and a given silicone absorbent flow rate. We observe that the percent removal of acetone remains independent of the feed composition, however, the outlet concentration of acetone in the treated gas increases with increasing acetone level in the feed gas for the given module and the absorbent liquid flow rate.

Figure 12:
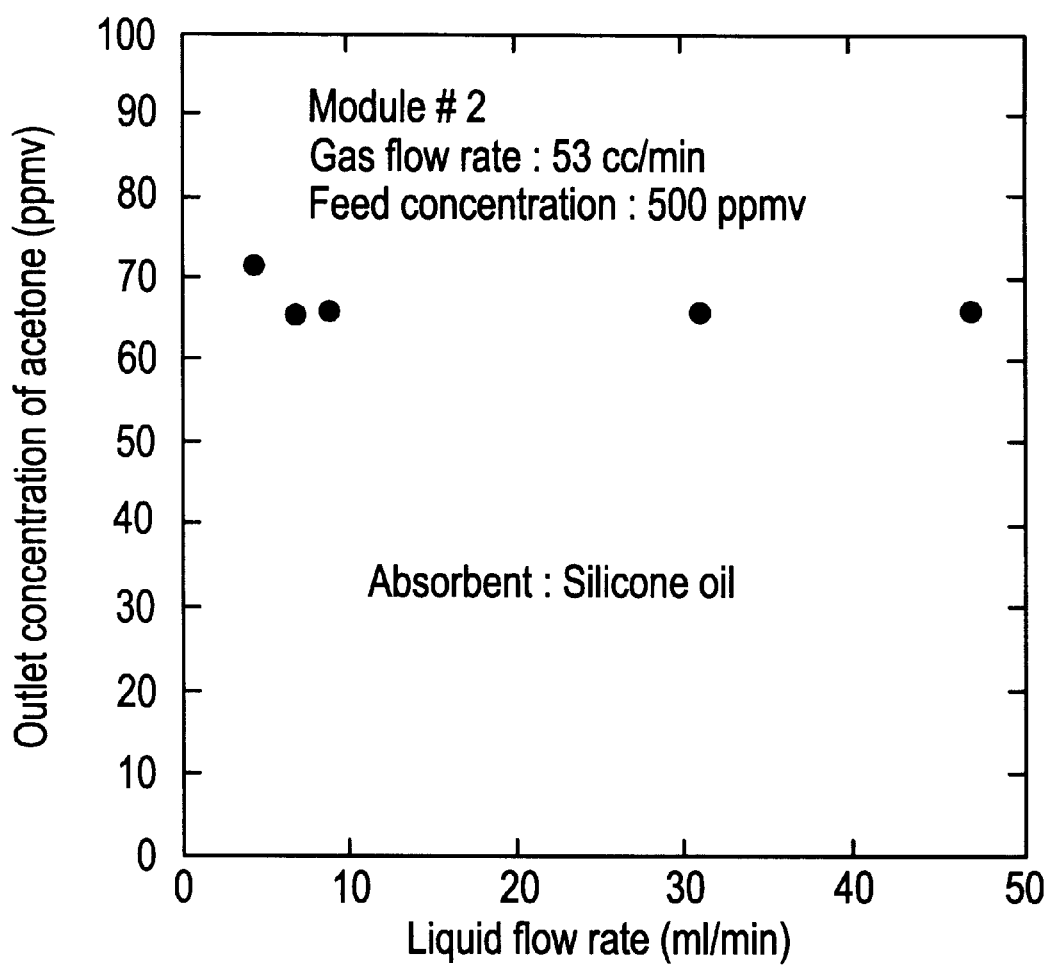
FIG. 12 illustrates the effect of the silicone oil absorbent flow rate on the concentration of acetone in the treated gas feed leaving the apparatus of the invention.
Figure 13:
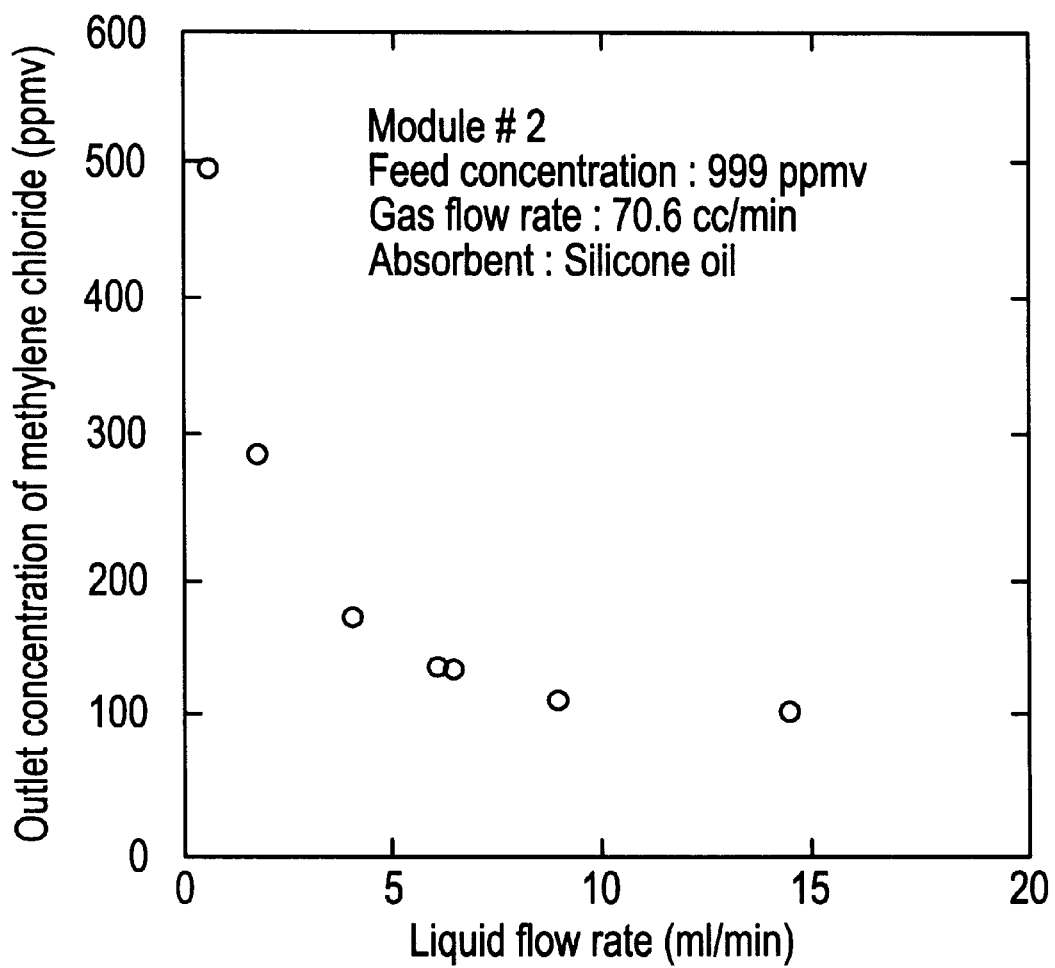
FIG. 13 illustrates the effect of the silicone oil absorbent flow rate on the outlet concentration of methylene chloride.
Figure 14:
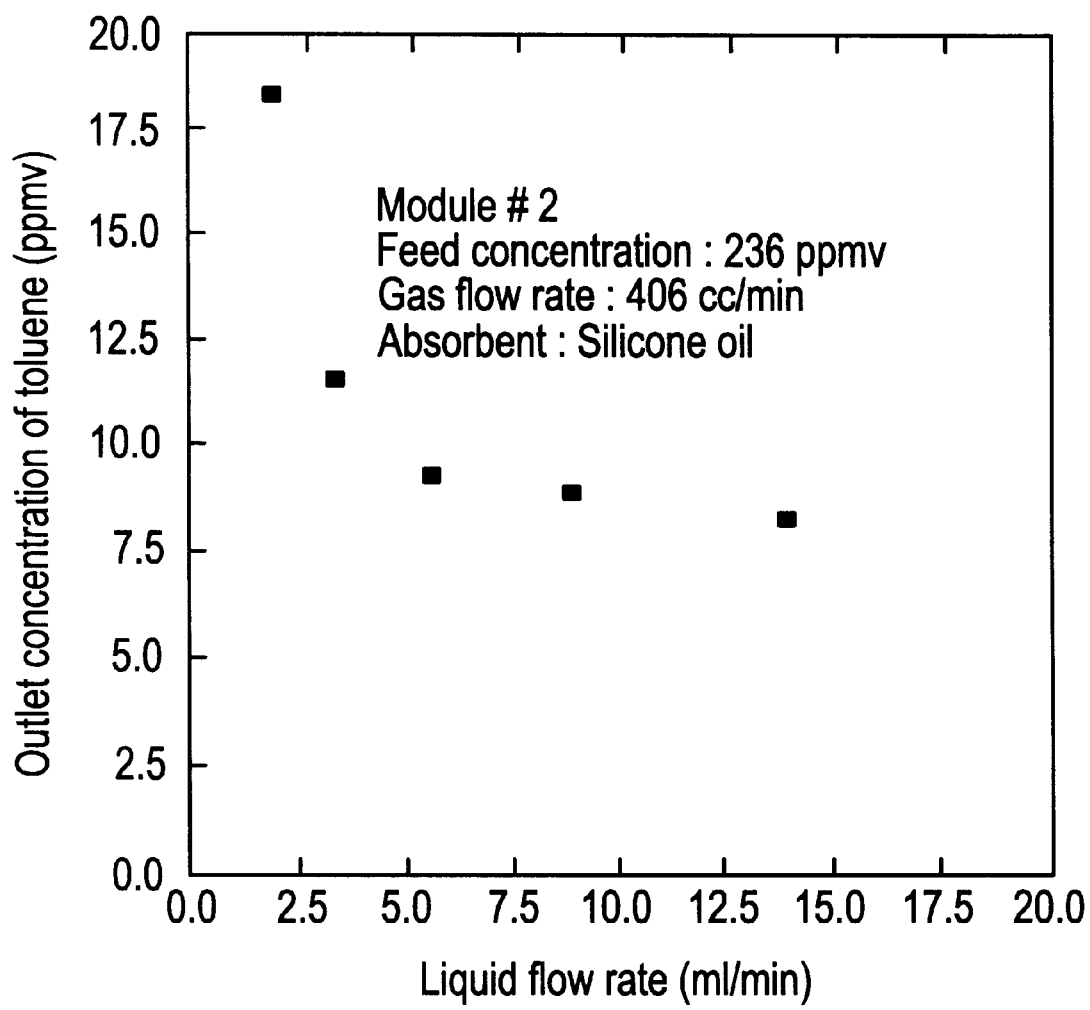
FIG. 14 illustrates the effect of the silicone oil absorbent flow rate on the outlet concentration of toluene.

What is the effect (if any) of the silicone absorbent flow rate on the exiting VOC composition of the cleaned gas? FIGS. 12, 13 and 14 show for the VOCs, acetone, methylene chloride and toluene respectively, that as the absorbent flow rate increases, the outlet VOC concentration decreases first and then achieves a constant value. Similar behavior has been observed for Paratherm® as the absorbent using the same module 2.

Figure 15:
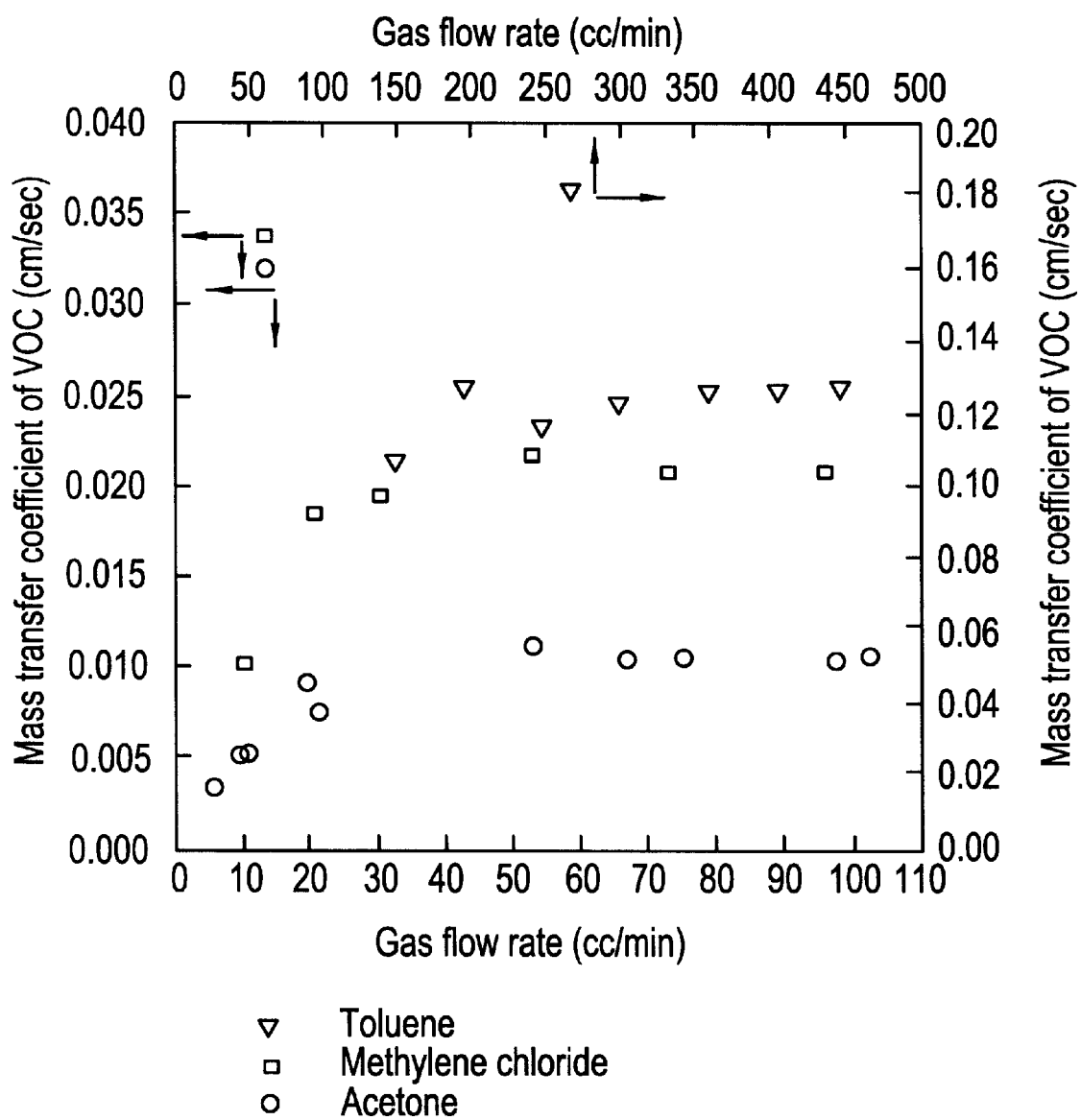
FIG. 15 illustrates the variation of the overall mass transfer coefficient as a function of the gas flow rate for absorption of various VOCs (toluene represented by inverted triangle; methylene chloride represented by open square; and acetone represented by open circle) in silicone oil (for experimental module 2).

FIG. 15 illustrates how the overall mass transfer coefficient, $K_{OG}$, for an individual VOC varies with the gas flow rate at any given absorbent flow rate. For low gas flow rates, it appears that K depends significantly on the gas flow rate. At higher gas flow rates, $K_{OG}$ becomes independent of the gas flow rate as shown in the Figure for methylene chloride and acetone. This plateau value is determined by the resistance of VOC diffusion through the stagnant absorbent in the membrane pores and in the flowing absorbent liquid.

Additional VOC Absorption Experiments Using Fibers Having a Nonporous Skin

The previous experiments, with the exception of the first one, employed absorption modules 1 and 2 made out of microporous Celgard® X-10 hollow fibers; further, the gas and the liquid contacted directly at each pore mouth on the fiber I.D. under conditions of the gas side having a slightly higher pressure than that of the liquid absorbent to maintain nondispersive contacting. We report now absorption cleanup of VOCs from $N_2$ using module 3 where the microporous polypropylene hollow fibers have an ultrathin plasma polymerized nonporous skin of silicone on the fiber outside diameter which prevents direct gas-liquid contact. There is an explicit criterion of phase pressures in such a case, namely, the gas and liquid pressures should be essentially equal or the liquid pressure should be higher.

Figure 16:
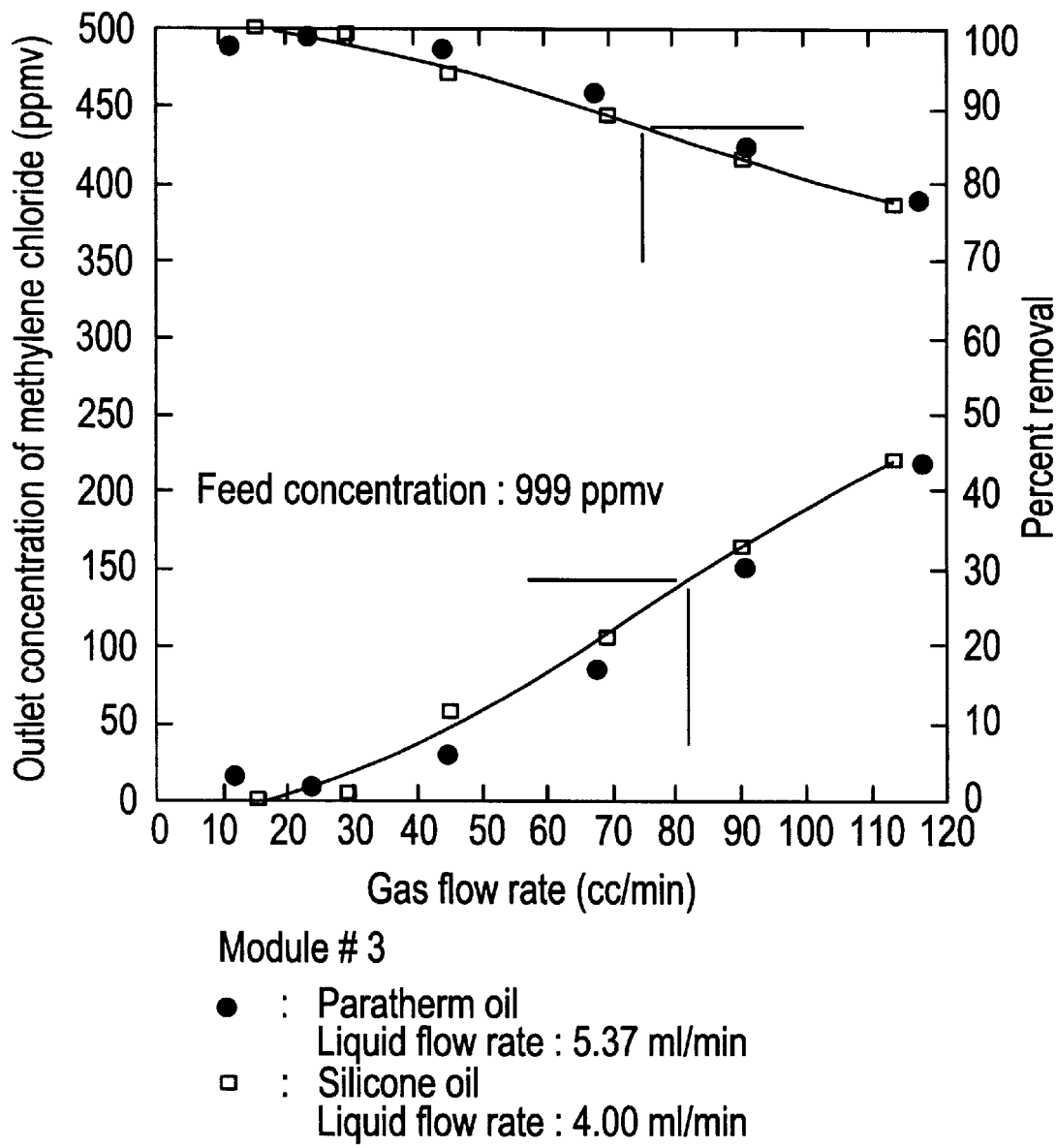
FIG. 16 illustrates the removal of methylene chloride by absorbents Paratherm oil (represented by solid circle) and silicone oil (represented by open square) in experimental module 3 as a function of gas flow rate.

FIG. 16 reports results of methylene chloride removal by two different absorbents, Paratherm® oil and silicone oil in module 3 built out of such fibers having a nonporous silicone skin. For both absorbents, the gas flowed on the tube side and the absorbent was on the shell side. We observe that the outlet concentration of the VOC, methylene chloride, decreases strongly as the gas flow rate is decreased. The behavior shown in this countercurrent membrane absorber is quite similar to those observed earlier in FIGS. 6, 7, 8 and 9.

Figure 17:
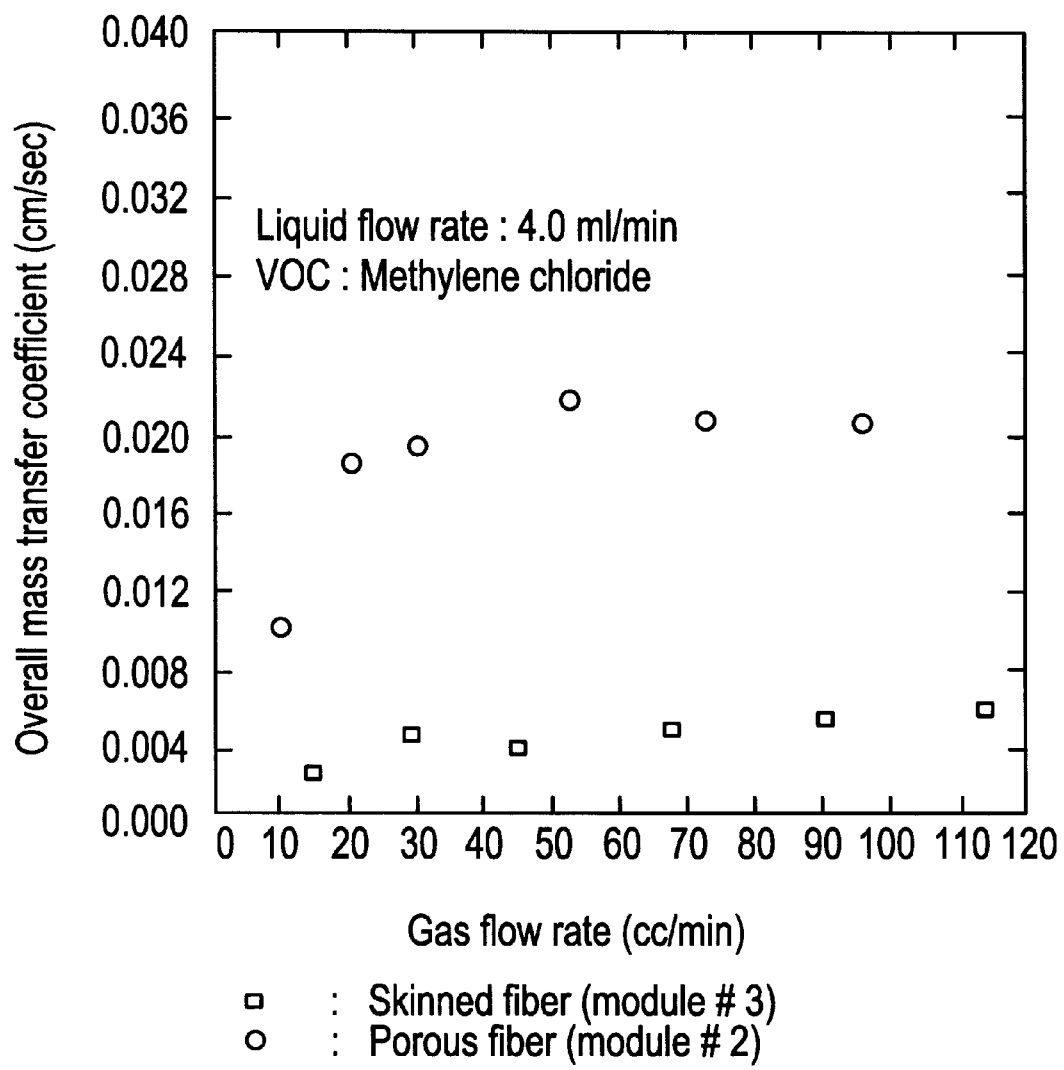
FIG. 17 illustrates a comparison of the overall mass transfer coefficient of methylene chloride absorption in two types of fibers, one a microporous fiber with a thin silicone skin (open square); the other a porous fiber (open circle).

This similarity should not foster the assumption that the skinned fibers having a nonporous silicone layer provide no extra resistance. In fact, there is significant extra resistance as shown in FIG. 17 where the overall mass transfer coefficient, $K_{OG}$, has been plotted for methylene chloride absorption for both kinds of fibers, i.e., module 2 and module 3. We find that the plateau values of the overall mass transfer coefficient in module 3 are about 3.5 times lower than those in module 2. It is then obvious that the microporous hollow fibers without a coating provide faster VOC absorption in the absorbent oil in a nondispersive fashion when compared with hollow fibers having a nonporous highly VOC-permeable silicone skin.

We have suggested earlier that nondispersive gas absorption will not be achieved if the gas pressure is significantly higher than that of the liquid when the fiber has a nonporous skin or coating. We provide now the basis for such a suggestion. An absorption experiment was run in module 3 using Paratherm® as an absorbent. The gas flowed at 34.1 cc/min on the tube-side at a pressure of 10 psig. The absorbent flowed countercurrently on the shell-side at 5.6 ml/min; the absorbent was at atmospheric pressure. Bubble generation in the absorbent stream was observed. The bubble flow rate was found to be approximately 0.3 cc/min. Experiments were also conducted under identical conditions with the gas flowing at atmospheric pressure. No bubble generation was observed.

One may now conclude wrongly that there may not be any operational advantage to having a nonporous skin or coating since in either case (with or without coating) one of the phases has to be at a higher pressure unless both phases have the same pressure. For many VOC removal applications, the gas ($N_2$ or air) is at atmospheric pressure. However, the viscous absorbent encounters pressure drop during its flow which suggests that the VOC-containing gas pressure should be raised from atmospheric if a microporous fiber without a nonporous coating or skin is used. This requirement is eliminated when a nonporous skin or coating is employed. This will result in considerable energy saving since the gas pressure does not have to be raised much. The skinned fiber also allows absorption under conditions of arbitrarily high liquid pressure levels for the absorbent (within certain limits so as not to damage the skin or the fibers). This condition is not allowed in a microporous fiber without nonporous skin since breakthrough pressures are usually much lower.

Simultaneous VOC Absorption-Stripping

A continuous process for VOC absorption from $N_2$/air into an absorbent via either of two different kinds of hollow fibers requires simultaneous regeneration of the spent absorbent in a VOC stripper. We have used the membrane module 2 containing microporous hollow fibers as the VOC absorber where the gas flowed at a pressure slightly higher than that of the absorbent along with the membrane module 3 as the VOC stripper (and, therefore, an absorbent regenerator). The experimental schematic shown in FIG. 1 was employed.

Figure 18:
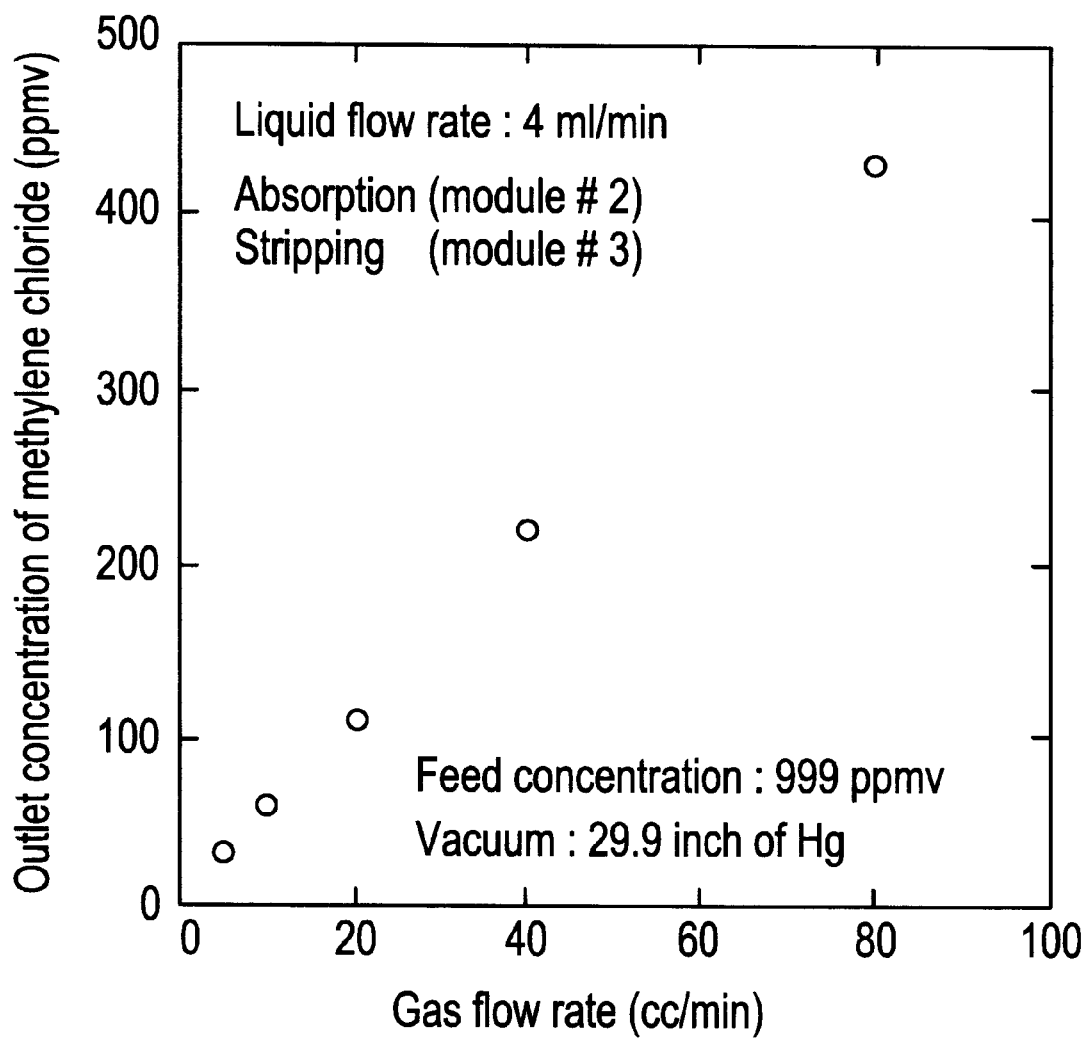
FIG. 18 illustrates the outlet concentration as a function of gas flow rate for simultaneous absorption and stripping of methylene chloride.

The results for simultaneous methylene chloride absorption and stripping using silicone oil are shown in FIG. 18. A vacuum of 29.9 inch Hg was pulled in the bore of the fibers in module 3 to remove VOC from the absorbent flowing on the module 3 shell side on a continuous basis. In module 2, the absorber, the flow arrangement was similar to simple absorption experiments, namely, gas through the fiber bore and the absorbent on the shell side (and in the pores) flowing countercurrent to the gas flow direction. We observe that the feed gas containing 999 ppmv of methylene chloride was brought down to around 20 ppm on a continuous basis when the feed gas flow rate was low. If the membrane stripper module had a higher surface area, there is a possibility that the cleaned gas composition would have been even lower. However, the level of available vacuum plays an important role here. Too high a level of vacuum, although useful for reducing this treated gas composition to an even lower level via higher level of regeneration of the absorbent, is not desirable from a practical larger scale operational point of view.

Simultaneous Removal of Multiple VOCs

Absorption experiments have been carried out where the $N_2$ gas stream contained multiple VOCs. Table 3 shows the Paratherm®-based absorption data for two flow rates of a $N_2$ stream containing acetone (226 ppmv), methylene chloride (201 ppmv), toluene (204 ppmv) and methanol (163 ppmv). These experiments were carried out in module 2 as well as module 3; the results from the latter are shown in Table 3. We observe very high rates of removal of all the VOCs except for the highly polar methanol. Results with module 2 not reported here are even better.

TABLE 3

Absorption Data* for a Mixed VOC-$N_2$ Gas Mixture

| VOC Composition in Inlet $N_2$ Gas Stream (ppmv) | Gas Flow Rate (cc/min) | | | |
|---|---|---|---|---|
| | 11.65 | | 34.08 | |
| | Outlet Composition (ppmv) | Removal (%) | Outlet Composition (ppmv) | Removal (%) |
| Acetone 226 | 13.42 | 94.06 | 86.97 | 61.52 |
| Methylene Chloride 201 | 9.17 | 95.43 | 17.35 | 91.34 |
| Toluene 204 | 0.00 | 100.00 | 0.00 | 100.00 |
| Methanol 163 | 77.23 | 52.62 | 128.35 | 21.26 |
| Total 794 | 99.82 | 87.43 | 232.67 | 70.70 |

*Module #3
Absorbent: Paratherm NF ™
Liquid Flow Rate: 5.6 ml/min
Temperature: 22° C.

Additional Results and Considerations

During our experiments with Paratherm® or silicone oil, we did not observe any peaks of the vapors of these absorbents in the GC. This indicated that their very low vapor pressures at 25° C. and the silicone skin barrier on the membrane have reduced their pressure (if any) in the gas stream to be scrubbed to sub-ppm level.

Paratherm® absorbent is known to be stable over long lengths of time. Silicone oil, having a much higher vapor pressure, however, slowly starts deteriorating after one year. We have taken such a degraded silicone oil and observed small peaks in GC from such a deteriorated silicone oil flowing as an absorbent in the microporous hollow fiber.

The absorbent scheme and operational conditions vis-à-vis the different phase pressures are equally useful and applicable to general gas scrubbing and regeneration of absorbents. The gas species to be selectively removed could be $CO_2$, $H_2S$, $SO_2$, $O_2$, etc. The absorbents may be aqueous solutions of alkanolamines, hindered amines and pure polar hydrocarbons like n-methylpyrollidone, dimethylsulfoxide, sulfolane, etc.

We have employed hollow fibers having an ultrathin nonporous skin of plasma polymerized silicone (poly (dimethylsiloxane)) on the hollow fiber outer surface. This material must be highly permeable to the gas species or VOCs to be absorbed. Other materials of considerable use for VOC removal are copolymers of silicone-polycarbonate, neoprene and different rubbers, poly(1-trimethyl silyl-1-propyne) etc.

Microporous hollow fibers that are hydrophobic were used. It is equally useful to use microporous hollow fibers that are hydrophilic. However, when used in that contacting mode without a nonporous skin, it is important to have the nonpolar organic absorbent in the pore and not water since that would increase the resistance to VOC mass transfer considerably.

A hollow fiber whose wall is a gel membrane may also be used. It is preferable that the gel is due to the organic absorbent being used; otherwise, the resistance to VOC transfer will be significantly increased.

We have employed a parallel-flow hollow fiber module with two streams flowing countercurrently. One can also employ crossflow modules to increase the shell-side mass transfer coefficient. Further, the shell-side may have baffles to improve the flows distribution.

It is not intended to limit the present invention to the specific embodiments disclosed above. It is recognized that changes may be made in the process and apparatus specifically described herein without departing from the scope and teachings of the present invention.

Various references are cited herein, which are incorporated herein by reference in their entirety.

What is claimed is:

1. A volatile solute-transfer system for transferring a volatile solute from a gas-feed mixture to a liquid absorbent, the solute-transfer system comprising:

(a) an absorption module;
   (b)) a porous membrane located within and connected to the absorption module, the porous membrane being wettable by the liquid absorbent, the porous membrane dividing the absorption module into a gas feed chamber and a liquid absorbent chamber, the absorption module having a gas-feed mixture inlet port and a gas-feed mixture outlet port which communicate with the gas-feed chamber and a liquid absorbent inlet port and a liquid absorbent outlet port which communicate with the liquid absorbent chamber, in which the absorption module contains a pressure difference control means for maintaining a difference between a gas pressure of the gas-feed mixture in the gas feed chamber and a liquid pressure of a liquid absorbent in the liquid absorbent chamber substantially within a predetermined pressure range so that an interface between the gas-feed mixture and the liquid absorbent is substantially immobilized at the membrane, to effectively prevent the formation of a dispersion of gas-feed mixture and liquid absorbent in either chamber on opposing sides of the membrane;
   (c) a regeneration module; and
   (d) a nonporous membrane that is permeable to the volatile solute located within and connected to the regeneration module, the nonporous membrane dividing the regeneration module into a liquid absorbent chamber and a vacuum atmosphere or sweep vapor chamber, the regeneration module having a liquid absorbent inlet port and a liquid absorbent outlet port which communicate with the liquid absorbent chamber and a vacuum outlet port or sweep vapor outlet port which communicates with the vacuum or sweep vapor chamber.

2. The solute transfer system according to claim 1 in which the porous membrane located within the absorption module is in the shape of a hollow tube, the interior of the tube defining the gaseous feed chamber.

3. The solute transfer system according to claim 1 in which the porous membrane is composed of a hydrophobic material selected from the group consisting of porous polyethylene, porous polypropylene, porous polytetrafluoroethylene, porous polyetherketone, porous polyamides, porous polyimides, porous polyvinylidene fluoride, porous polyvinyliene fluoride, porous polysulfone, and porous polyethersulfone.

4. The solute transfer system according to claim 1 in which the porous membrane is composed of a hydrophilic material selected from the group consisting of porous regenerated cellulose, porous cellulose acetate, porous cellulose acetate-nitrate, porous cellulose triacetate, polyacrylonitrile, microporous glass, and porous porcelain.

5. The solute transfer system according to claim 1 in which the porous membrane is composed of a polymeric gel swollen by the absorbent liquid.

6. The solute transfer system according to claim 1 in which the nonporous membrane located within the regeneration module is in the shape of a hollow tube, the interior of the tube defining one vacuum atmosphere chamber.

7. The solute transfer system according to claim 1 in which the nonporous membrane located within the regeneration module is in the shape of a hollow tube, the exterior of the tube defining one vacuum atmosphere chamber.

8. The solute transfer system according to claim 1 in which the porous membrane has an ultrathin plasma polymerized nonporous layer of silicone on an outside surface.

9. The solute transfer system according to claim 1, in which the liquid absorbent is a high boiling, inert, nonvolatile, organic liquid which has a low vapor pressure.

10. The solute transfer system according to claim 9 wherein the absorbent liquid is selected from the group consisting of mineral oils, dimethyl/polymethyl siloxanes, paraffinic oils, synthetic hydrocarbon solvents, vegetable oils, heat transfer fluids, aqueous solutions of alkanolamines, hindered amines, and pure polar hydrocarbons.

11. The solute transfer system according to claim 1 in which the vacuum outlet port communicates with a condenser.

12. The solute transfer system according to claim 1 in which the volatile solute is an organic compound is selected from the group consisting of acetone, methylene chloride, methanol, ethanol, toluene, methylethylketone, carbon tetrachloride, xylene, trichloroethane, isobutanol, chlorobenzene, pentane, hexane, octane, fluorinated hydrocarbons (CFC-11, CFC-12, CFC-113, CFC114, CFC-115, etc.), HCFC ($C_2HCl_2F_3$), and perchloroethylene.

13. The solute transfer system according to claim 1 in which the solute is selected from the group consisting of carbon dioxide ($CO_2$), hydrogen sulfide ($H_2S$), sulfur dioxide ($SO_2$), and oxygen ($O_2$).

14. A volatile solute transfer system comprising:

(a) an absorption module containing a plurality of microporous hollow fibers through the lumen of which a gas containing a volatile solute can pass and a liquid absorbent which contacts the exterior of the tubes;

(b) a regeneration module containing a plurality of nonporous hollow fibers forming hollow tubes in which a vacuum or sweep vapor is applied to one surface and the liquid absorbent containing the volatile solute extracted from the gas is on the opposite surface;

(c) pressure control means for maintaining a difference between a gas pressure of the gas and a liquid pressure of the liquid absorbent substantially within a predetermined pressure range so that an interface between the gas and the liquid absorbent is substantially immobilized at the membrane, to effectively prevent the formation of a dispersion of gas-feed mixture and liquid absorbent on opposing sides of the membrane; and (d) means for transferring the liquid absorbent from the absorption module to the regeneration module and from the regeneration module to the absorption module.

15. The absorption module according to claim 14 in which the microporous hollow fibers are hydrophobic.

16. The absorption module according to claim 15 in which the microporous hydrophobic hollow fibers have the properties of Celgard X-10 or Celgard X-20.

17. The solute transfer system according to claim 15 in which the microporous hydrophobic hollow fibers of the liquid absorbent chamber have an ultrathin plasma polymerized nonporous layer of silicone on an outside surface.

18. The solute transfer system according to claim 14 in which the liquid absorbent is a high boiling inert, nonvolatile organic liquid with a low vapor pressure.

19. The solute transfer system according to claim 18 in which the organic liquid absorbent is selected from the group consisting of mineral oils, dimethyl/polymethyl siloxanes, paraffinic oils, synthetic hydrocarbon solvents, vegetable oils, heat transfer fluids, aqueous solutions of alkanolamines, hindered amines, and pure polar hydrocarbons.

20. The solute transfer system according to claim 14 in which the volatile solute is selected from the group consisting of acetone, methylene chloride, methanol, ethanol, toluene, methylethylketone, carbon tetrachloride, xylene, trichloroethane, isobutanol, chlorobenzene, pentane, hexane, octane, fluorinated hydrocarbons (CFC-11, CFC-12, CFC-113, CFC114, CFC-115, etc.), HCFC ($C_2HCl_2F_3$), and perchloroethylene.

21. The solute transfer system according to claim 14 in which the hollow fibers of the regeneration chamber have an ultrathin plasma polymerized nonporous silicone skin selected from the group consisting of dimethylsilicone, copolymers of silicone-polycarbonate, poly(1-trimethylsily-1-propyne), fluoroelastomers, polyurethane, and polyvinyl fluoride.

22. The solute transfer system according to claim 14 in which the solute is selected from the group consisting of carbon dioxide ($CO_2$), hydrogen sulfide ($H_2S$), sulfur dioxide ($SO_2$), and oxygen ($O_2$).

* * * * *